US011295486B1

(12) United States Patent
Troutman et al.

(10) Patent No.: US 11,295,486 B1
(45) Date of Patent: Apr. 5, 2022

(54) DIGITAL MAKEUP PALETTE

(71) Applicant: L'OREAL, Paris (FR)

(72) Inventors: Mindy Christine Troutman, New York, NY (US); Sandrine Gadol, New York, NY (US); Francesca D. Cruz, Sleepy Hollow, NY (US)

(73) Assignee: L'OREAL, Paris (FR)

( * ) Notice: Subject to any disclaimer, the term of this patent is extended or adjusted under 35 U.S.C. 154(b) by 0 days.

(21) Appl. No.: 17/137,970

(22) Filed: Dec. 30, 2020

(51) Int. Cl.
| | |
|---|---|
| *G06T 11/00* | (2006.01) |
| *G06F 3/0482* | (2013.01) |
| *G06F 3/04883* | (2022.01) |
| *G06K 9/00* | (2022.01) |

(52) U.S. Cl.
CPC ......... *G06T 11/001* (2013.01); *G06F 3/0482* (2013.01); *G06F 3/04883* (2013.01); *G06K 9/00281* (2013.01); *G06T 2200/24* (2013.01)

(58) Field of Classification Search
CPC . G06T 11/001; G06T 2200/24; G06F 3/0482; G06F 3/04883; G06K 9/00281
See application file for complete search history.

(56) References Cited

U.S. PATENT DOCUMENTS

| | | | |
|---|---|---|---|
| 10,395,436 B1* | 8/2019 | Li | G06T 7/75 |
| 2005/0135675 A1* | 6/2005 | Chen | G06T 11/00 |
| | | | 382/162 |
| 2009/0148072 A1* | 6/2009 | Brand | H04N 5/23229 |
| | | | 382/307 |
| 2015/0089446 A1* | 3/2015 | James | G06F 3/04842 |
| | | | 715/810 |
| 2016/0210602 A1* | 7/2016 | Siddique | G06Q 20/204 |
| 2016/0357578 A1* | 12/2016 | Kim | A45D 44/005 |
| 2018/0075524 A1* | 3/2018 | Sartori Odizzio | G06Q 30/0643 |
| 2018/0278879 A1* | 9/2018 | Saban | G06K 9/00 |

\* cited by examiner

*Primary Examiner* — Michelle L Sams
(74) *Attorney, Agent, or Firm* — Oblon, McClelland, Maier & Neustadt, L.L.P.

(57) ABSTRACT

An augmented reality system for makeup, includes a makeup objective unit including computation circuitry operably coupled to a graphical user interface configured to generate one or more instances of user selectable makeup objectives and to receive user-selected makeup objective information, a makeup palette unit operably coupled to the makeup objective unit, the makeup palette unit including computation circuitry configured to generate at least one digital makeup palette for a digital makeup product in accordance with the user-selected makeup objective information, and a makeup objective visualization unit including computation circuitry configured to generate one or more instances of a virtual try-on in accordance with the user-selected makeup objective information.

20 Claims, 26 Drawing Sheets

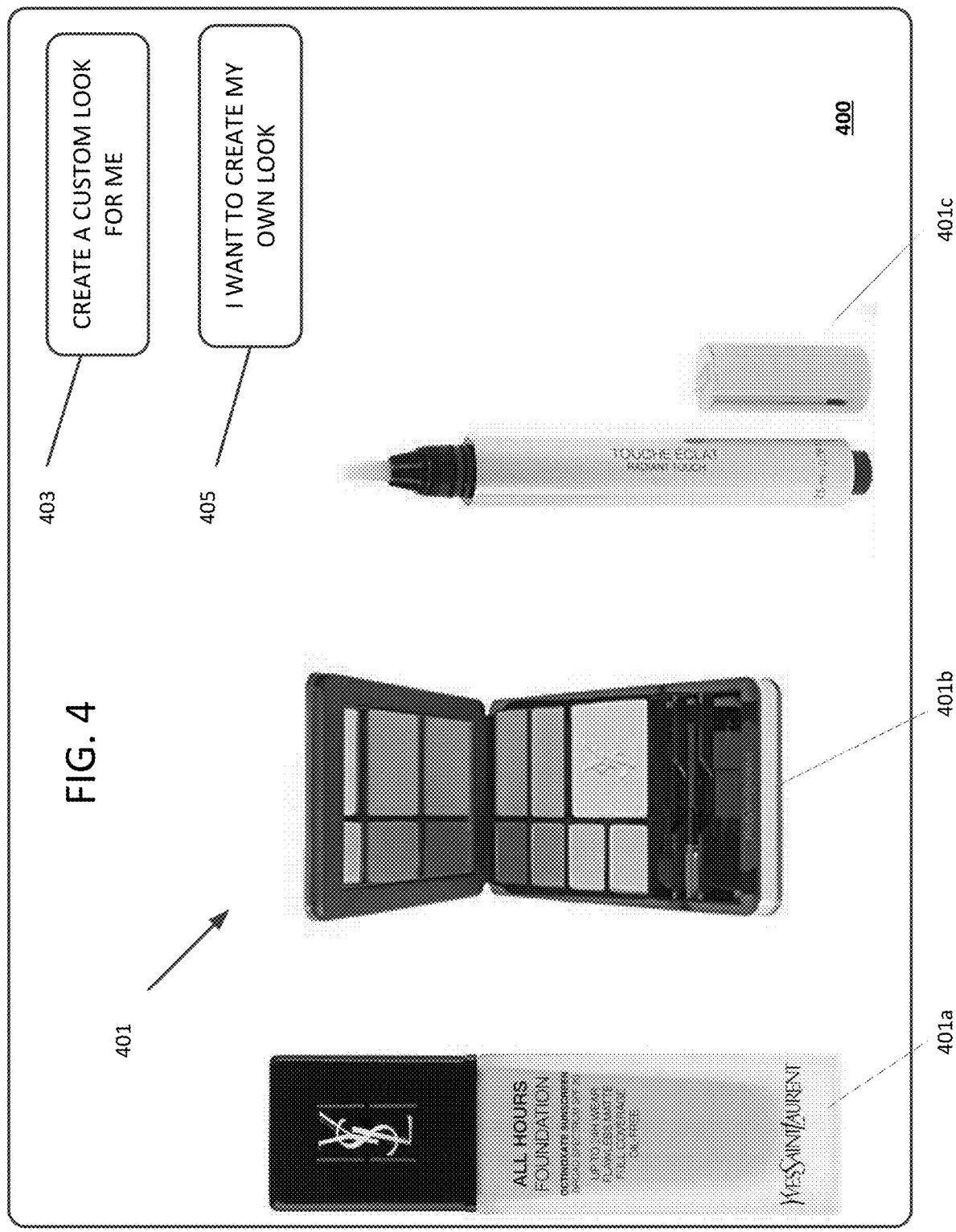

| Look/Makeup | Lipstick | | | | | | Eye Shadow | | | | | |
|---|---|---|---|---|---|---|---|---|---|---|---|---|
| Feature | Palette | Color | Cover | Shade | Finish | Application gesture | Palette | Color | Cover | Shade | Finish | Application gesture |
| Date night | | | | | | | | | | | | |
| Universal | | | | | | | | | | | | |
| Preference-previous | | | | | | | | | | | | |
| Favorite-previous | | | | | | | | | | | | |
| Girl's night out | | | | | | | | | | | | |
| Special date | | | | | | | | | | | | |
| Holiday | | | | | | | | | | | | |
| Going out with mother-in-law | | | | | | | | | | | | |
| party | | | | | | | | | | | | |
| New year's eve | | | | | | | | | | | | |
| Bridal prom | | | | | | | | | | | | |
| Spring | | | | | | | | | | | | |
| Summer | | | | | | | | | | | | |
| Fall | | | | | | | | | | | | |
| Quick makeup | | | | | | | | | | | | |
| Average makeup | | | | | | | | | | | | |
| Take-your-time makeup | | | | | | | | | | | | |
| cheery | | | | | | | | | | | | |
| happy | | | | | | | | | | | | |
| Notice-me | | | | | | | | | | | | |

DIGITAL MAKEUP PALETTE

TECHNICAL FIELD

The present disclosure is directed to a digital make-up palette and a method for a personalized augmented reality experience using the digital make-up palette.

BACKGROUND

Smartphones with front facing cameras offer a capability of taking pictures and videos of the person having the camera at hand in a manner that the person can view the image that is to be captured. Various mobile applications, also refererred to as an App, have been developed that make use of front facing cameras. A common App is one that allows taking a self portrait photo that is referred to as a selfie, and inserting the selfe into some social media context or forwarding the selfe to be shared with others by e-mail or text.

Some cosmetic product companies have begun to develop Apps that provide assistance in selecting cosmetic products. The Apps may provide tools for searching for particular types of make-up, or searching for a product that may be a user's favorite or just purchasing a previously used product. Some Apps offer tutorials on how to apply certain types of make-up. Some Apps provide assistance in choosing colors of lipstick or eyeshadow by displaying color palettes. Some Apps provide color matching features to assist in searching for a color that matches clothing, and accessory, or a color from a picture.

Some cosmetic product companies have begun to make use of the cameras in smartphones, tablets, and laptops by offering product try-on applications. Some of these applications are implemented as Web applications, or an App. These try-on applications work by taking a self portrait photo with the smartphone camera, uploading the photo to the Web application, then applying virtual makeup products to the uploaded image. These try-on applications may offer a variety of options, such as smoothing skin, lifting cheeckbones, adjusting eye color. These try-on applications may provide the user with the ability to add any type and color of makeup product, as well as change the color intensity.

However, try-on applications offered thus far tend to create a look by way of photo editing tools. Some of the prior try-on applications start with an uploaded photograph and provide one step functions to apply makeup types and colors, then allow editing of the made-up photo. Such tools do not capture a personal makeup experience. Also, prior try-on application tools do not provide for creation of custom looks. For example, a user may want a Friday date night look. The prior try-on applications may offer a Friday date night look, but that look may not be something that the user had in mind. Provided tools may be used to perform further editing in an attempt to obtain a look that is what the user believes is a Friday date night look. However, such an approach is limited by the features of the editing tools. A user may want a Friday date night look that is based on the user's mood, or a mood that the user may want to portray, which may require extensive editing.

These prior try-on web applications or Apps lack full personalization partly because the prior virtual try-on applications are limited to certain brands of physical make-up products. A user may not be able to create a certain look that they have in mind, or that they want to experiment. There is a need to provide a custom try-on experience for a particular user that allows the user to have fun with trying on makeup and not be disappointed by an unrealistic appearance.

Furthermore, a user may have problem areas, such as blemishes, a scar, age spots, hyperpigmentation, etc. that they wish to treat with makeup. A user may also wish to emphasize certain facial features, such as cheek bone, eyes, lips. There is a need to provide a custom try-on experience that can help to address particular problem areas or best facial features of the particular user.

An alternative of distributing special personalization machines of formula is time consuming and costly because a sampling system would need to be added to the machine so as to deliver a small dose of product for the consumer to test and then modify the product recipe depending on the bias measured on a consumer's skin.

Further, e-commerce personalization try-on services are not scalable to end consumers with their smartphone because variation in skin problem areas and facial features for each consumer is too high.

The aforementioned "background" description is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

An augmented reality system for makeup, includes a makeup objective unit including computation circuitry operably coupled to a graphical user interface configured to generate one or more instances of user selectable makeup objectives and to receive user-selected makeup objective information; a makeup palette unit operably coupled to the makeup objective unit, the makeup palette unit including computation circuitry configured to generate at least one digital makeup palette for a digital makeup product in accordance with the user-selected makeup objective information; and a makeup objective visualization unit including computation circuitry configured to generate one or more instances of a virtual try-on in accordance with the user-selected makeup objective information.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 3A is a method in which a user creates their own custom look, and FIG. 3B is a method in which the custom look is created by a mobile application in accordance with an exemplary aspect of the disclosure;

FIG. 4 is an exemplary user interface for choosing between user creation or App creation of a look in accordance with an exemplary aspect of the disclosure;

FIG. 15 illustrates an exemplary look-makeup matrix for the recommender system in FIG. 12;

Figure 1:
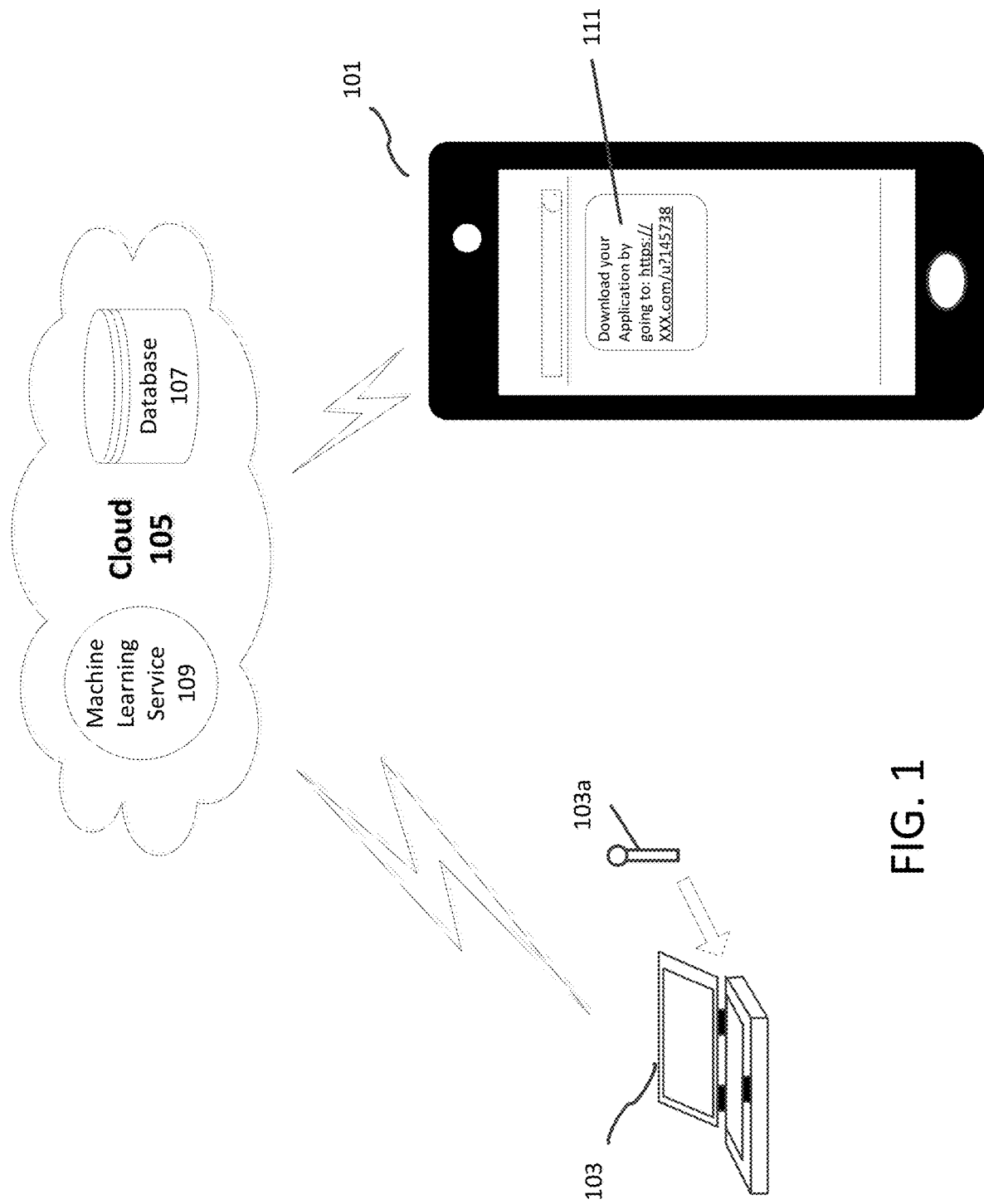
FIG. 1 is a diagram of a system in accordance with an exemplary aspect of the disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

DETAILED DESCRIPTION

Aspects of this disclosure are directed to a digital makeup palette in an augmented reality arrangement. The digital makeup palette is an assortment of colors for a digital makeup, either for a single part of a face, or for a full face. The augmented reality arrangement can capture steps as the user applies makeup and can create a custom makeup filter for the applied makeup. The augmented reality arrangement can analyze the steps to identify what the user considers as problem areas and best features. The results of the analysis may be used to improve custom recommendations. The augmented reality arrangement may perform the analysis with a machine learning model. The machine learning model may include an artificial neural network that estimates problem areas and best features.

FIG. 1 is a diagram of a system in accordance with an exemplary aspect of the disclosure. Embodiments include a software application, or mobile application (App). For purposes of this disclosure, herein below the term App will be used interchangeably with the software application or mobile application, and makeup application will be used in reference to the process of applying digital makeup, either virtually or physically. A software application may be executed on a desktop computer or laptop computer 103. A mobile application may be executed on a tablet computer or other mobile device 101. For purposes of this disclosure, the software application and mobile application are described in terms of the mobile application 111. In each case, the mobile application 111 may be downloaded and installed on a respective device 101, 103. In some embodiments, the desktop computer or laptop computer 103 may be configured with a microphone 103a as an audio input device. The microphone 103a may be a device that connects to a desktop computer or laptop computer 103 via a USB port or audio input port, or wireless via a Bluetooth wireless protocol. The mobile device 101 may be a cell phone or smartphone that is equipped with a built-in microphone. In some embodiments, the software application or mobile application 111 may include a communication function to operate in conjunction with a cloud service 105. The cloud service 105 may include a database management service 107 and a machine learning service 109. The database management service 107 may be any of the types of database management systems provided in the cloud service 105. For example, the database management service 107 may include a database that is accessed using a structured query language (SQL), and a unstructured database that is accessed by keys, commonly referred to as No SQL. The machine learning service 109 may perform machine learning in order to allow for scaling up and high performance computing that may be necessary for the machine learning. Also, the software application or mobile application 111 may be downloaded from a cloud service 105. Although FIG. 1 shows a single cloud service 105, laptop computer 103 and mobile device 101, it should be understood that a number of mobile devices, laptop computers, as well as desktop computers and tablet computers, may be connected to one or more cloud services.

The software application or mobile application 111 may be implemented as an augmented reality system that includes a makeup objective unit operably coupled to a graphical user interface, a makeup palette unit coupled to the makeup objective unit, and a makeup objective visualization unit. The makeup objective unit may be configured to generate one or more instances of user selectable makeup objectives and to receive user-selected makeup objective information. The makeup palette unit may be configured to generate at least one digital makeup palette for a digital makeup product in accordance with the user-selected makeup objective information. The makeup objective visualization unit may be configured to generate one or more instances of a virtual try-on in accordance with the user-selected makeup objective information. Each of the makeup objective unit, the makeup palette unit, and the makeup objective visualization unit may include computation circuitry of a computer system, ranging from a mobile computer device 101, 103 to a desktop computer device. A minimum requirement is that the computer device includes an interactive display device.

Figure 2:
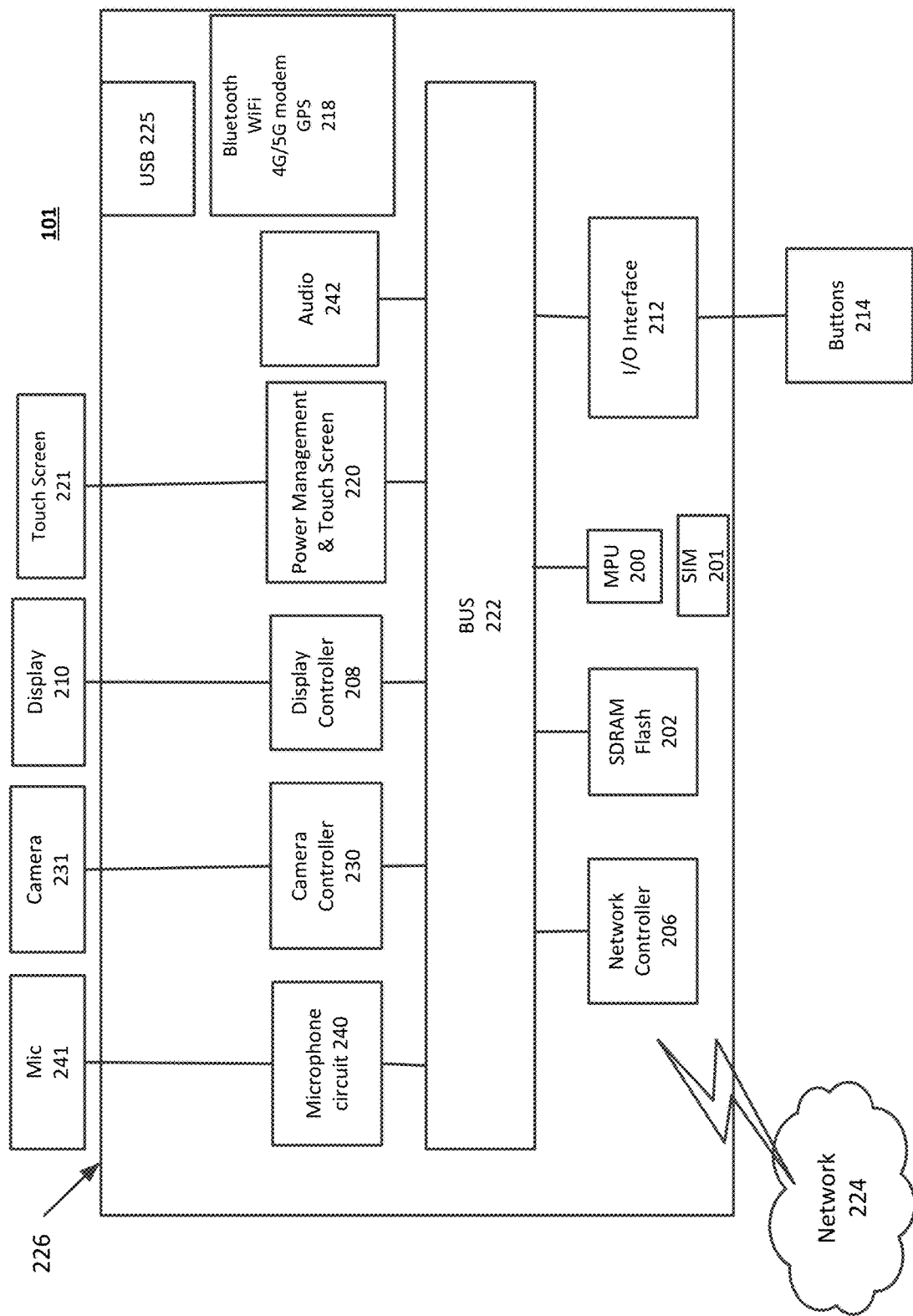
FIG. 2 is a block diagram of a computer system for a mobile device.

FIG. 2 is a block diagram of a mobile computer device. In one implementation, the functions and processes of the mobile device 101 may be implemented by one or more respective processing/computation circuits 226. The same or similar processing/computation circuits 226 may be included in a tablet computer or a laptop computer. A desktop computer may be similarly configured, but in some cases, may not include a built-in touch screen 221, microphone 241 or camera 231. A processing circuit includes a programmed processor as a processor includes computation circuitry. A processing circuit may also include devices such as an application specific integrated circuit (ASIC) and conventional circuit components arranged to perform the recited functions. Note that circuitry refers to a circuit or system of circuits. Herein, the computation circuitry may be in one computer system or may be distributed throughout a network of computer systems.

Next, a hardware description of the processing/computation circuit 226 according to exemplary embodiments is described with reference to FIG. 2. In FIG. 2, the processing/computation circuit 226 includes a Mobile Processing Unit (MPU) 200 which performs the processes described herein. The process data and instructions may be stored in memory 202. These processes and instructions may also be stored on a portable storage medium or may be stored remotely. The processing/computation circuit 226 may have a replaceable Subscriber Identity Module (SIM) 201 that contains information that is unique to the network service of the mobile device 101.

Further, the advancements are not limited by the form of the computer-readable media on which the instructions of the inventive process are stored. For example, the instructions may be stored in FLASH memory, Secure Digital Random Access Memory (SDRAM), Random Access Memory (RAM), Read Only Memory (ROM), Programmable Read-Only Memory (PROM), Erasable Programmable Read-Only Memory (EPROM), Electrically Erasable Programmable Read Only Memory (EEPROM), solid-state hard disk or any other information processing device with which the processing/computation circuit 226 communicates, such as a server or computer.

Further, the advancements may be provided as a utility application, background daemon, or component of an operating system, or combination thereof, executing in conjunction with MPU 200 and a mobile operating system such as Android, Microsoft® Windows® 10 Mobile, Apple iOS® and other systems known to those skilled in the art.

In order to achieve the processing/computation circuit 226, the hardware elements may be realized by various circuitry elements, known to those skilled in the art. For example, MPU 200 may be a Qualcomm mobile processor, a Nvidia mobile processor, a Atom® processor from Intel Corporation of America, a Samsung mobile processor, or a Apple A7 mobile processor, or may be other processor types that would be recognized by one of ordinary skill in the art. Alternatively, the MPU 200 may be implemented on an Field-Programmable Gate Array (FPGA), Application Specific Integrated Circuit (ASIC), Programmable Logic Device (PLD) or using discrete logic circuits, as one of ordinary skill in the art would recognize. Further, MPU 200 may be implemented as multiple processors cooperatively working in parallel to perform the instructions of the inventive processes described above.

The processing/computation circuit 226 in FIG. 2 also includes a network controller 206, such as an Intel Ethernet PRO network interface card from Intel Corporation of America, for interfacing with network 224. As can be appreciated, the network 224 can be a public network, such as the Internet, or a private network such as LAN or WAN network, or any combination thereof and can also include PSTN or ISDN sub-networks. The network 224 can also be wired, such as an Ethernet network. The processing circuit may include various types of communications processors for wireless communications including 3G, 4G and 5G wireless modems, WiFi®, Bluetooth®, GPS, or any other wireless form of communication that is known.

The processing/computation circuit 226 includes a Universal Serial Bus (USB) controller 225 which may be managed by the MPU 200.

The processing/computation circuit 226 further includes a display controller 208, such as a NVIDIA® GeForce® GTX or Quadro® graphics adaptor from NVIDIA Corporation of America for interfacing with display 210. An I/O interface 212 interfaces with buttons 214, such as for volume control. In addition to the I/O interface 212 and the display 210, the processing/computation circuit 226 may further include a microphone 241 and one or more cameras 231. The microphone 241 may have associated circuitry 240 for processing the sound into digital signals. Similarly, the camera 231 may include a camera controller 230 for controlling image capture operation of the camera 231. In an exemplary aspect, the camera 231 may include a Charge Coupled Device (CCD). The processing/computation circuit 226 may include an audio circuit 242 for generating sound output signals, and may include an optional sound output port.

The power management and touch screen controller 220 manages power used by the processing/computation circuit 226 and touch control. The communication bus 222, which may be an Industry Standard Architecture (ISA), Extended Industry Standard Architecture (EISA), Video Electronics Standards Association (VESA), Peripheral Component Interface (PCI), or similar, for interconnecting all of the components of the processing/computation circuit 226. A description of the general features and functionality of the display 210, buttons 214, as well as the display controller 208, power management controller 220, network controller 206, and I/O interface 212 is omitted herein for brevity as these features are known.

Figure 3A:
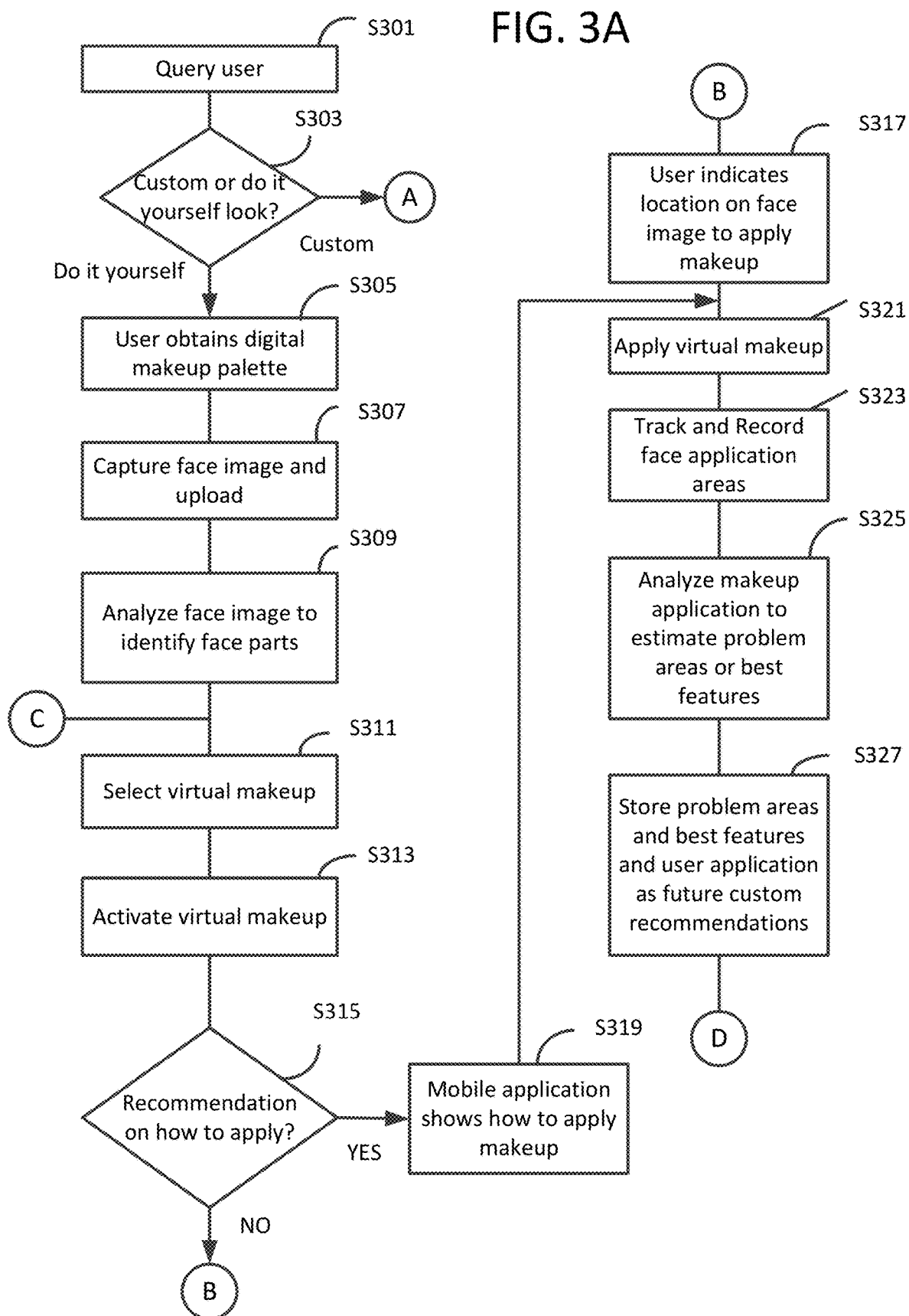
FIGS. 3A, 3B is a flowchart of a method of creating a custom look, where
Figure 3B:
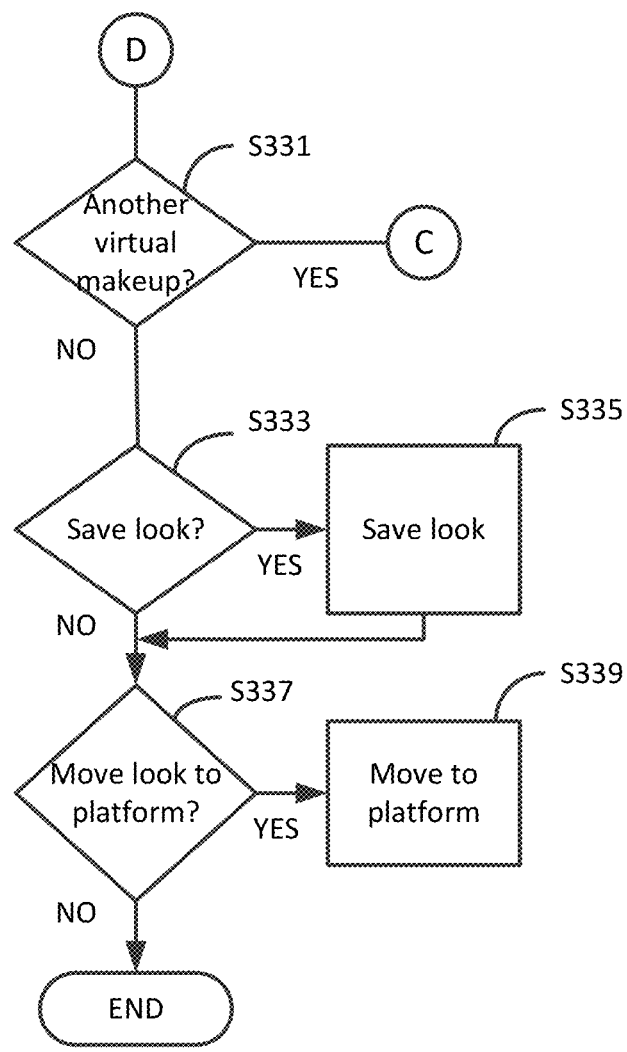

FIGS. 3A, 3B are a flowchart for a method of creating a custom look, as well as special treatment of facial problem areas and best facial features. FIG. 3A is a flowchart for a method of creating a custom look by way of a user applying a virtual makeup product having a digital palette in accordance with an exemplary aspect of the disclosure.

A disclosed embodiment includes a digital makeup palette. The digital makeup palette is a virtual palette for a digital makeup. In this disclosure, the terms virtual makeup and digital makeup may be used interchangeably. A digital makeup may have an assortment of colors to choose from. A particular digital makeup may have an associated makeup application gesture and one or more face parts where it is typically applied, and the digital makeup palette includes characteristics such as coverage, shade, and finish. Unlike physical makeup products, digital makeup is not limited to colors derived from chemical compositions, and may include a wider range of colors. Also, digital makeup may utilize coverage, shade, finish that are generated using characteristics of a display device, such as applying various filters for color temperature, exposure, contrast, saturation, and controlling RGB and HCL values.

Coverage is the actual coverage of the digital makeup typically based on a percentage of pigment that it contains. Coverage generally pertains to foundation makeup, but may also refer to corrective makeup or primer. A light cover makeup may contain lower than about 18% pigment. A medium cover product may contain about 18 to 23% pigment. A full cover makeup may contain up to about 35% pigment. Some makeup products may contain a higher amount of pigment. In some embodiments, the coverage for the digital makeup is implemented as an opacity filter representing a single brush stroke of the virtual makeup.

Shade of a digital makeup can range from fair to dark, or in some cases, very fair to deep, or even very deep. A shade may be for a single color, such as a skin color. In one or more embodiments, the shade for digital makeup is implemented as a range of a display color, for example, shades of red displayed according to RGB values.

Finish of a digital makeup may include common finishes such as matte (dull), cream (glossy or shiny), frost (reflective), and glitter (glitter particles). Finishes may be defined in terms of the amount of light reflected. Matte will reflect little of no light. Cream retains a pearl-like sheen. Frost and glitter reflect the most light. In one or more embodiments, the finish for digital makeup is implemented as color luminance (brightness). Matte may be a low luminance value and will hide imperfections. Frost may emanate greater luminance.

Digital makeup may also include various filters, including blur, color temperature, and saturation. Blur may be applied to a region having an imperfection so that the imperfection becomes less noticeable.

Prior to obtaining a makeup palette, in S301, the user may bring up an App 111 on a mobile device, tablet, laptop, or desktop computer. The App 111, via the makeup objective unit, may ask the user what type of look they wish to create. To assist the user in answering this question, the App 111 may generate a list of predefined makeup looks, and the user may select a predefined makeup look. Examples of predefined makeup looks may include season looks (spring, summer, fall), event looks (Friday date night, Girls night out, special date, going out with mother-in-law, holiday, party, new year's eve, Bridal, Prom), looks based on time to complete (quick makeup, average makeup, take-your-time makeup), mood looks (cheery, happy, notice-me), styles (natural, evening, glam, gothic, office), aesthetic looks (VSCO, eGirl, soft girl), to name a few.

In addition, the App 111, via the makeup objective unit, may ask the user to define their level of experience with using makeup. A user's level of experience may include beginner/novice level, experienced level, expert level, and professional. The beginner/novice level may be a user that has little or no experience in applying makeup. The experienced level may be a user that has previously applied makeup, and thus has some experience. The expert level may be a user that has been applying makeup for a while, such as a year or more, as well as has taken steps to learn how to properly apply makeup. The professional level may be a user that applies to others. In some embodiments, the App 111 may provide an interface that the user may use to create a user profile, which among other things, may include entering the user's level of experience.

The App 111 may utilize the selected look and user's level of experience as a starting point. For example, a user that is new to applying makeup may wish to experiment and possibly learn about applying makeup. An experienced user that has some experience in applying makeup before, but would like to expand their knowledge and creativity, may wish to try a new makeup product or makeup look. Expert users may have extensive experience in applying makeup, but would like to expand their creativity and obtain a look of a quality that would be produced by a professional makeup artist. Subsequently, the App 111 may use the selected look and user's level of experience in providing recommendations at later stages.

In S303, the App 111 may provide the user with a choice of having the App 111 provide a custom look or for the user to apply virtual makeup to an image of their face. In some embodiments, in S305, the makeup palette unit may generate at least one digital makeup palette. In particular, the user may obtain a digital makeup palette for a particular virtual makeup, for example by downloading a digital makeup from an App 111 store, or downloading from a website that offers digital makeup. In one or more embodiments, a user may modify a digital makeup palette to one for a variation of a makeup look. For example, a user may modify a digital makeup palette for a makeup look, such as VSCO girl look, to be more or less dramatic. A less dramatic look may involve obtaining a different digital makeup palette for the makeup look, or may involve obtaining a different digital makeup for a face part, e.g. lips, eye lids, nose.

FIG. 4 is an exemplary graphical user interface for an App 111 that includes a function for choosing a method of applying makeup. In some embodiments, the user may obtain a digital makeup palette (S305) before deciding (S303) on whether to have the App 111 perform a custom look or for the user to apply digital makeup. Referring back to FIG. 4, the user interface 400 may display products 401 that have been obtained by the user such as foundation 401a, eyeshadow 401b, and concealer 401c. The user interface 400 may provide the user with a choice of functions (see S303 in FIG. 3A), such as to create a custom look 403 or to 405 create a look by manually applying one or more virtual makeup.

In some embodiments, the App 111 may provide a user with a list of predefined looks, and the user may select a predefined look as a starting point. Upon selection of a predefined look, the App 111 may provide the user with a set of recommended digital makeup and/or digital makeup palette(s) for the selected look. The user may obtain digital makeup and digital makeup palette(s) from database 107 or from a makeup provider, for example from a Website for a makeup provider, based on the set of recommendations.

Figure 5:
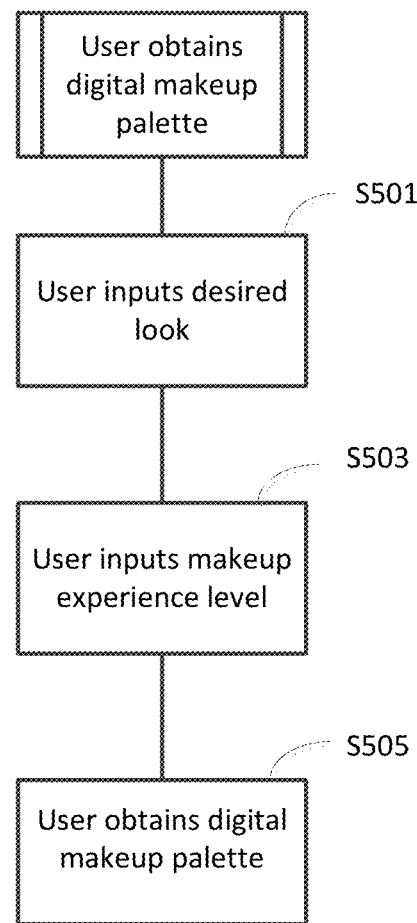
FIG. 5 is a flowchart of a method of obtaining a digital makeup palette in accordance with an exemplary aspect of the disclosure.

FIG. 5 is a flowchart of a method of obtaining a digital makeup palette. Regarding FIG. 5, in S501, the user inputs, via the makeup objective unit, a desired look and, in S503, a level of makeup experience. In S505, the user obtains, via the makeup palette unit, a digital makeup palette. The desired look, also referred to herein as a virtual try-on, may be selected from a list of predefined looks, or may be input as a look name that reflects a predefined look. In some cases a user may input a new look that does not have a predefined counterpart, or one that is a modification of a predefined look.

Figure 6:
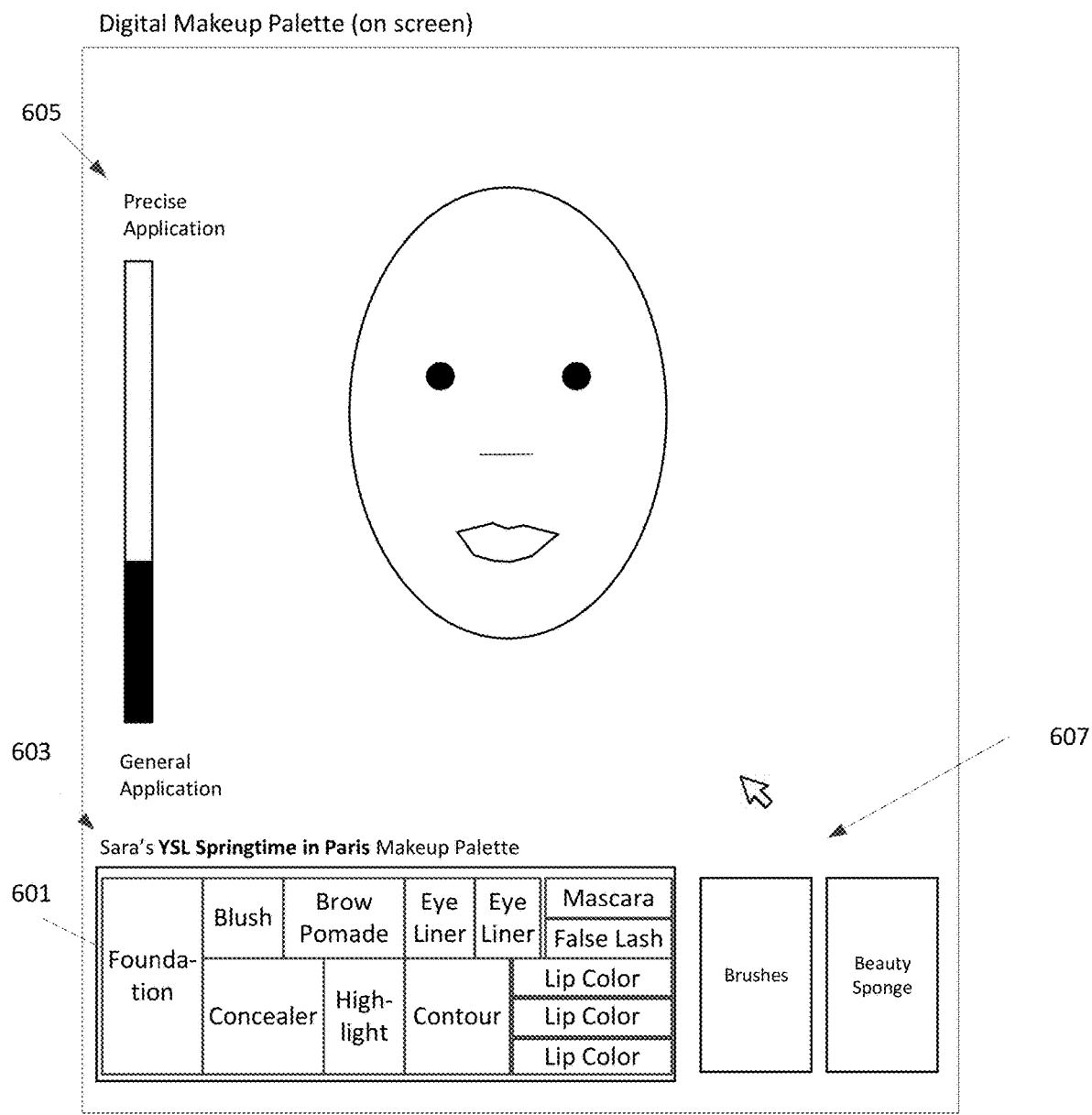
FIG. 6 illustrates an exemplary digital makeup palette in accordance with an exemplary aspect of the disclosure.

A digital makeup palette may be a palette for creating a particular type of makeup look. The digital makeup palette may be purchased from a makeup company similar to physical makeup products, or may be obtained from a Website that specializes in digital makeup products. FIG. 6 illustrates a user interface having a digital makeup palette in accordance with an exemplary aspect of the disclosure. The user interface may include a digital makeup palette 601 for a particular makeup look 603 and for a particular user experience level 605. The digital makeup palette 601 may include buttons for selecting particular digital makeup, of a specific color, coverage, shade, and finish. The user experience level 605 may be controlled by a sliding bar for a range over general to precise application. The user interface may include buttons for selecting makeup applicator tools 607.

A digital makeup palette includes one or more particular digital makeup, which similar to physical makeup is of specific color, coverage, shade, and finish. Unlike physical makeup, coverage may be implemented as an opacity filter, shade may be implemented as a range of rgb values, and finish may be a color density or color brightness.

Figure 7:
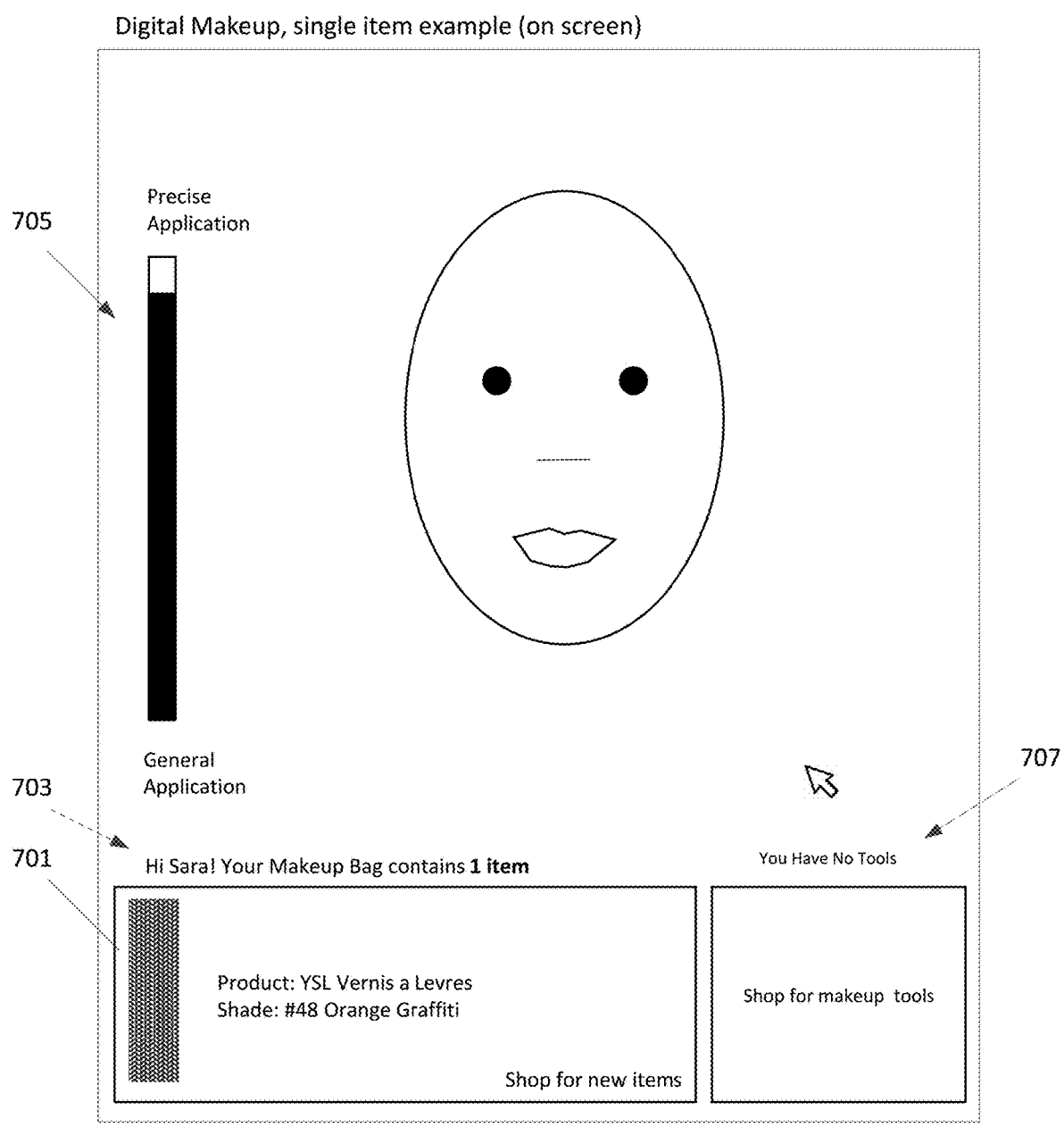
FIG. 7 illustrates an exemplary digital makeup in accordance with an exemplary aspect of the disclosure.

A digital makeup palette may also be a general purpose makeup palette. Further, a digital makeup palette may be for a particular virtual makeup for a part of a face. FIG. 7 illustrates a user interface having a container for one or more virtual makeup and a container for one or more makeup applicator tools. The virtual makeup may be a product 701 or products obtained from one or more makeup provider websites. The virtual makeup products may be stored in a makeup bag for a user 703. A user experience level 705 may be controlled by a sliding bar for a range over general to precise application. The makeup applicator tools may be stored in a container 707. Various makeup applicator tools may be used for applying each particular virtual makeup product. Types of applicator tools may include brushes, sponge makeup applicators, and makeup applicator puffs. Brushes may be of various widths, have an angled tip, flat tip or pointed tip. Special brushes, such as mascara brushes have bristles. A common sponge applicator is a sponge swab, either single or double tipped. Some sponges are flat, oval shaped. Some sponges may be wedge shaped. Puffs may be of various sizes and materials. Some makeup products are in the form of a makeup pencil, e.g., eyebrow pencils, eyeliner pencils, and lip liner pencil. Concealer and highlighter products may have built-in pen-like dispensers.

The virtual makeup may include applicator tools that may be configured to operate according to actual physical gestures using a stylus, mouse, a physical applicator tool with a built-in motion sensor, or even the user's finger. A physical gesture may be made to cause the virtual brush to apply a brush stroke that is commensurate with the movement and force of a stylus. In some embodiments, the stylus may be used on a 3D touch surface of a mobile device in which the amount of force on the touch screen produces a line having thickness that is commensurate with the force. In some embodiments, a stylus may take the form of a makeup applicator and include both a motion sensor and force sensor to detect motion and force of a brush stroke as the user uses the stylus to virtually apply a makeup to a face image.

When the user chooses to create their own custom look (Do it yourself in S303), in S307, the mobile application 111 running on the mobile device 101 or laptop computer 103 can use the built-in camera function to capture an image of the face of the user. In some embodiments, the camera 231 is used to capture a video of the user. In some embodiments, the camera 231 is used to capture several images of the face of the user from slightly different directions and/or in different lighting conditions. As an alternative, a previously captured image, images, or video may be uploaded to the mobile application 111. Further, the previously captured image, images, or video may be taken using an external camera device, or may be obtained from an internal storage device of the mobile device or laptop computer, or from an external storage device.

In some embodiments, when an image is captured, in S309, the mobile application 111 may perform face recognition and identify parts and their locations in the face image including lips, eyes, nose, ears and hair. In order to perform face recognition, the mobile application 111 may perform image processing operations in order to improve image features, such as to improve lighting. For instance, a user may inadvertently take a self-picture when bright light or sunshine is from a direction behind the user. The mobile application 111 may brighten the face image of the user. Other image processing operations may be performed to improve the image quality.

Figure 8:
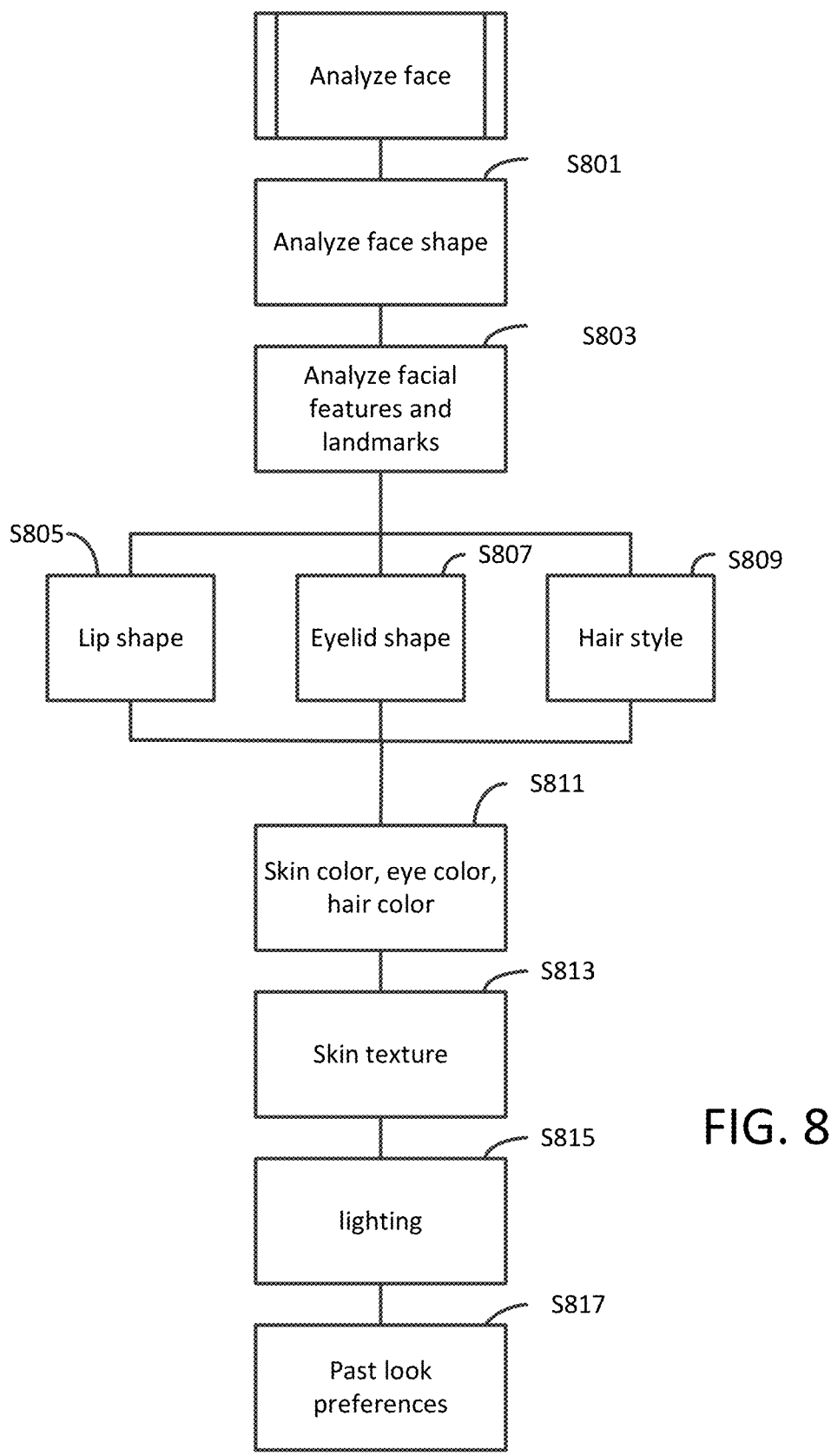
FIG. 8 is a flowchart of the face analysis step in more detail in accordance with an exemplary aspect of the disclosure

FIG. 8 is a flowchart of the face analysis step in more detail.

In S801, the captured image may be analyzed to determine a face shape. In one or more embodiments, the face shape of the captured face of the user may be detected using a machine learning model. The machine learning model may be trained to classify face shape using face images with known face shapes. Recently image classification has been performed using a type of neural network that is inspired by how the visual cortex of human brain works when recognizing objects. The neural network is a family of networks known as convolution neural networks (CNN). Other approaches have been proposed for image classification and continue to be improved upon. Other approaches for image classification that may be used for image classification include linear regression, decision tree, random forest and support vector machine, to name a few. In some embodiments, the machine learning model may be trained remotely using the machine learning service 109 of the cloud service 105.

Figure 9:
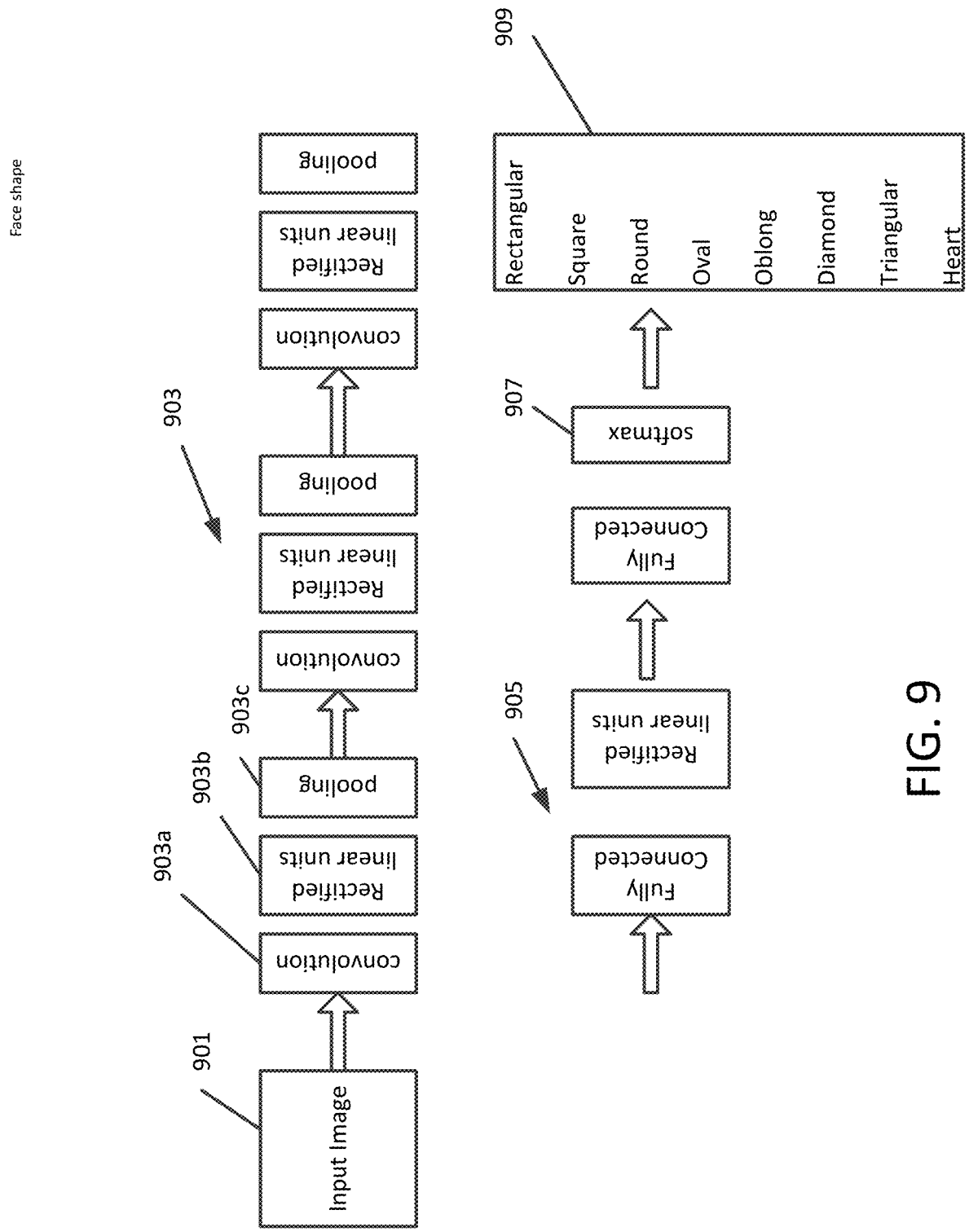
FIG. 9 is a block diagram of a CNN for classifying face shape.

In one or more embodiments, an architecture of a machine learning model that may be used to classify face shape is a CNN. FIG. 9 is a block diagram of a CNN for classifying face shape. Dimensions and activation functions of the CNN may be varied depending on available processing power and desired accuracy. The dimensions include number of channels, number of neurons of each layer and the number of layers. Possible activation functions include logistic, rectified linear unit, among others.

The convolution neural network (CNN) may be made up of several types of layers. A convolution component 903 may be made up of a convolution layer 903*a*, a pooling layer 903*c*, and a rectified linear unit layer 903*b*. The convolution layer 903*a* is for developing a 2-dimensional activation map that detects the special position of a feature at all the given spatial positions. The pooling layer 903*c* acts as a form of downsampling. The rectified linear unit layer 903*b* applies an activation function to increase the nonlinear properties of the decision function and of the overall network without affecting the receptive fields of the convolution layer itself. A fully connected layer 905 includes neurons that have connections to all the activations amongst the previous layers. A loss layer specifies how the network training penalizes the deviation between the predicted and true layers. The loss layer 907 detects a class in a set of mutually exclusive classes. A type of loss layer is a softmax function, which provides an output value for each of multiple classes.

In some embodiments, the loss layer 907 may be the softmax function. The softmax function provides a probability value for each class. In an exemplary embodiment, the classes 909 may include square, rectangular, round, oval, oblong, diamond, triangular, and heart face shapes.

In S803, the mobile application 111 may further analyze facial features and landmarks. Similar to face shape, the facial features and landmarks of the captured face of the user may be detected using a machine learning model. The machine learning model may be trained to detect facial landmarks. As with face shape classification, a CNN architecture similar to FIG. 9 may be used for face landmark detection. Other approaches to classification may also be used.

Figure 10:
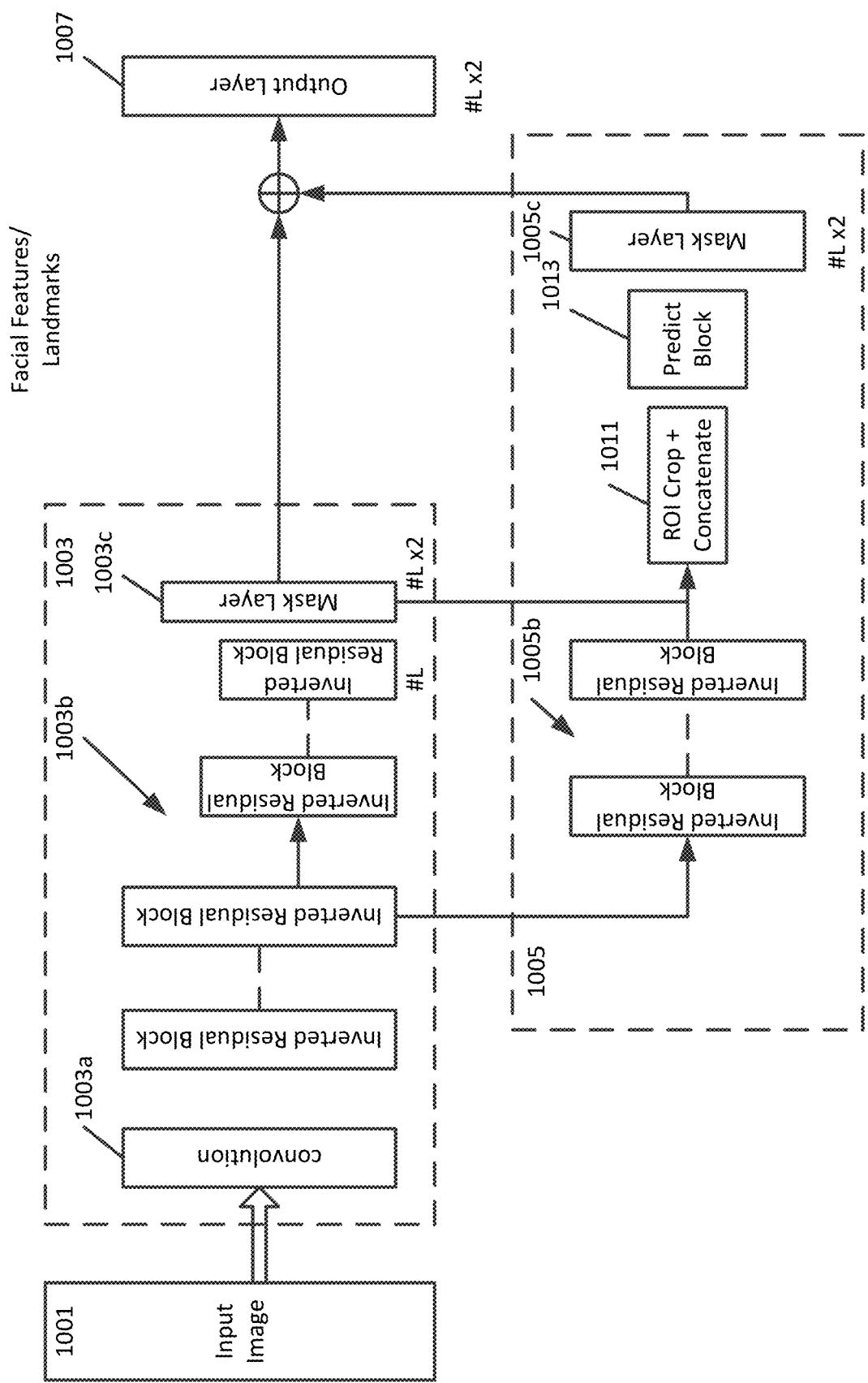
FIG. 10 is a diagram of a deep learning neural network for face landmark detection.

FIG. 10 is a diagram of a deep learning neural network for face landmark detection. Similar to the architecture in FIG. 9, the deep learning neural network is a convolution neural network. In order to improve training of the deep learning neural network, residual connections may be included. In one or more embodiments, inverted residual structures may be included in which residual connections are made to earlier layers in the network. Regarding the architecture in FIG. 10, the network is provided as two stages, 1003 and 1005. The first stage 1003 is a convolution stage for performing feature extraction. The second stage 1005 performs prediction in regions of interest.

The architecture of the first stage 1003 includes a convolution section 1003a that, provided an input face image 1001, performs convolution and max pooling operations. The convolution section 1003a is connected to an inverted residual structure 1003b. A mask layer 1003c is connected to the inverted residual structure 1003b. The size of the mask layer 1003c is based on the number of landmarks (e.g., 2×L, the number of landmarks). The mask layer 1003c encodes the spatial layout of the input object.

The architecture of the second stage 1005 includes an inverted residual structure 1005b that is connected to the inverted residual structure 1003b of the first stage 1003. Also, the mask layer 1003c of the first stage 1003 is applied to the results of the inverted residual structure 1005b and provided as input for performing region of interest cropping in ROI and Concatenate Block 1011. The ROI and Concatenate Block 1011 is based on the number of channels in the inverted residual structure 1005b and the number of landmarks. A predict block 1013 predicts landmarks and approximate locations in the mask layer 1005c. The predictions for the regions of interest of the second stage 1003 are combined with the landmarks estimated by mask 1003c for the total image to obtain output landmarks in output layer 1007.

In one or more embodiments, the landmarks for a face include eyes, nose, lips, cheekbones, areas around the eyes including eye brows, eye lids, as well as hair. In some embodiments, landmarks may include possible facial anomalies.

The specific dimensions of each layer and the number of layers may depend on parameters including the desired accuracy, hardware to perform the machine learning model, and the length of time to train the machine learning model. The machine learning model may be trained using the machine learning service 109 of the cloud service 105.

Analysis of facial features, S803, may further include detection of lip shape S805, eyelid shape S807, and hair style S809. The detected landmarks can be used to calculate contours of the lips, eyes, and hair style. In addition, other facial features such as skin color S811 and skin texture S813 may also be determined from the face image. Skin color and skin texture may be determined using image processing techniques. Types of skin tone may include, non-limiting, fair, light, medium, deep. Types of skin texture may include, non-limiting, soft, smooth, coarse, leathery.

An additional feature of a facial image may be lighting (image brightness). In S815, image lighting (brightness) may be determined using image processing techniques. Brightness may be defined as a measure of the total amount of perceived light in an image. In some embodiments, brightness of an image may be increased or decreased from its initial as captured brightness level.

In S817, past look preferences may be retrieved from a database 107. Past look preferences can include characteristics of a digital makeup, including color, coverage, shade, finish, and application gesture that was used for a past look. Past user preferences may include digital makeup characteristics for a particular part of the face, and can also include a choice of digital makeup that was applied for a particular look.

Figure 11:
FIG. 11 is an exemplary user interface for selecting a virtual product to apply.

In S311, the user interface may include a function to select a virtual makeup. FIG. 11 is an exemplary user interface for selecting a virtual makeup to apply. A user interface screen 1100 may include a message 1101 with instructions for selecting a virtual makeup using a pointer 1103.

In S313, when the virtual makeup is selected the mobile application 111 may perform a function to activate the selected virtual makeup. The virtual makeup may be activated by retrieving characteristics of the virtual makeup, including applicator swipe gesture(s) and typical area(s) of a face where the virtual makeup may be applied. In some embodiments, data associated with the virtual makeup may include coverage, shade, and finish.

In S315, the mobile application 111 may display a message asking the user if they want a recommendation on how to apply the virtual makeup. An example of a user interface to display a request for recommendation message is shown in FIG. 12.

Figure 12:
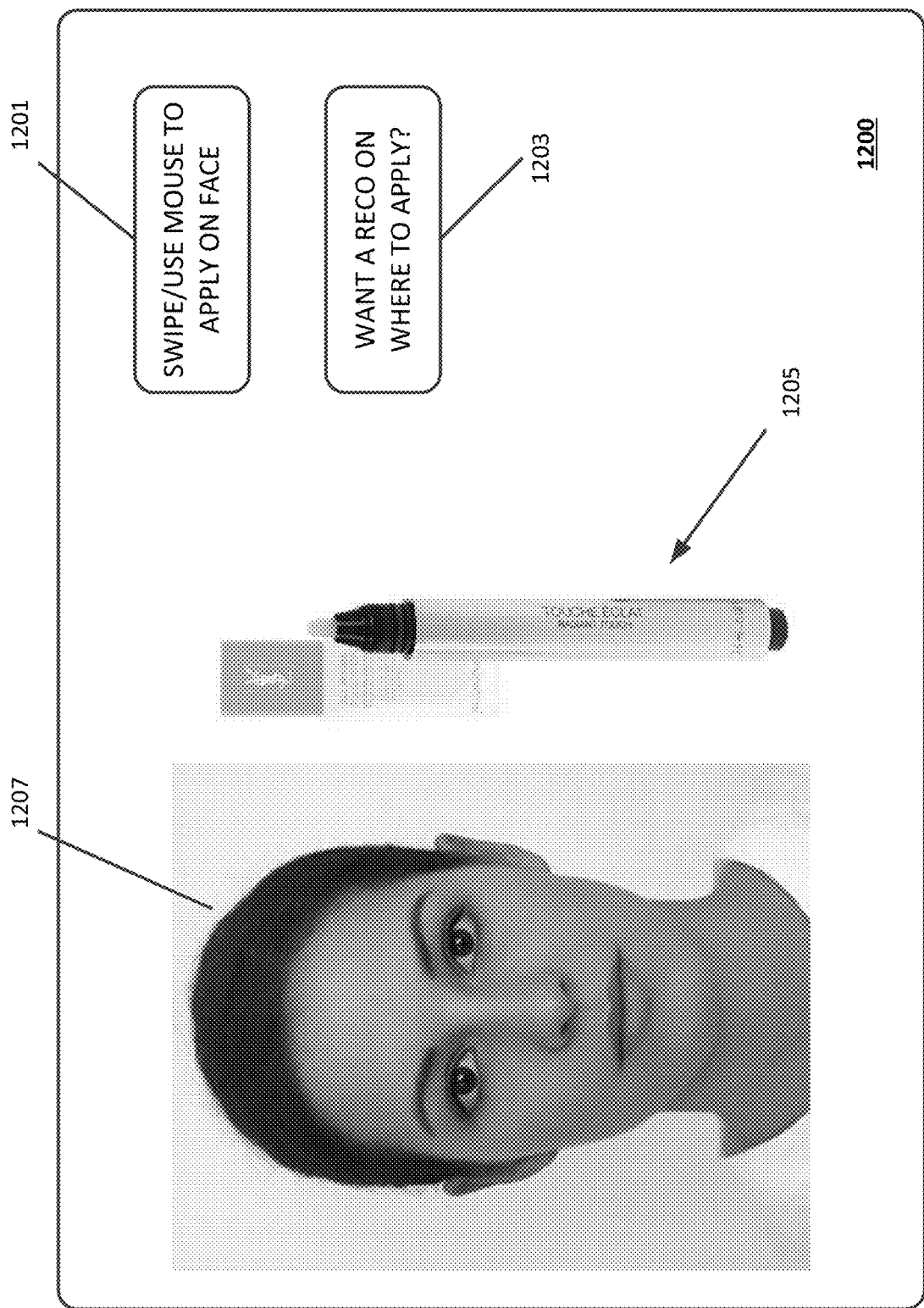
FIG. 12 is an exemplary user interface for choosing between user applying makeup and recommending how to apply makeup.

FIG. 12 is an exemplary user interface for choosing between user applying makeup and the mobile application recommending how to apply makeup. The user interface 1200 may display a button 1203 for selecting a recommendation on how to apply the virtual makeup 1205. The user interface 1200 may also display, as an alternative, a button 1201 instructing the user to swipe a stylus or mouse to apply the virtual makeup on the face image 1207.

Figure 13:
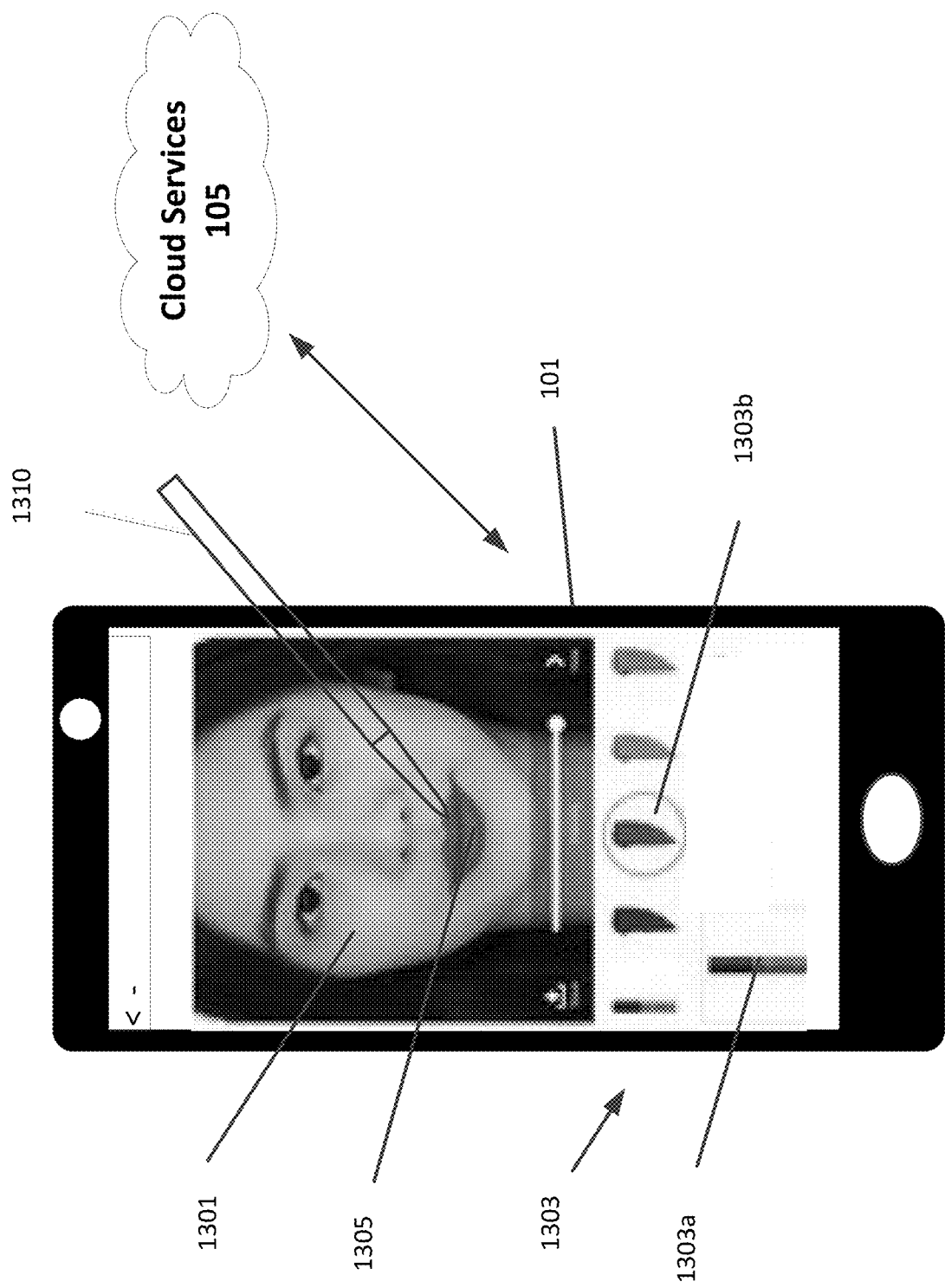
FIG. 13 is an exemplary mobile application in accordance with an exemplary aspect of the disclosure.

When the user selects not to obtain a recommendation (NO in S315), in S317, the user may indicate a location on the face image where the virtual makeup is to be applied. In S321, the user may apply, via the makeup objective visualization unit, the virtual makeup by making swipes at facial locations using the stylus or mouse. FIG. 13 is an exemplary user interface on a mobile device 101. When the button 1201 is selected, the user interface may display the face image 1301 and a digital makeup palette 1303. A user may select a color 1303b from the digital makeup palette 1303 to apply a virtual makeup 1303a to a specific location 1305 using a swipe gesture of a stylus 1310. The screen on the mobile device 101 may be a touch screen that includes a zoom function that can be used to expand or contract the face image 1301 in order to adjust a view of a facial feature. In some embodiments, the mode of the touch screen may be switched to allow for use of the stylus to apply the virtual makeup to the face image without moving the image.

In an alternative decision, when the user selects to obtain a recommendation (YES in S315), in S319, the mobile application 111 indicates a location on the face image where the virtual makeup is to be applied.

Figure 14:
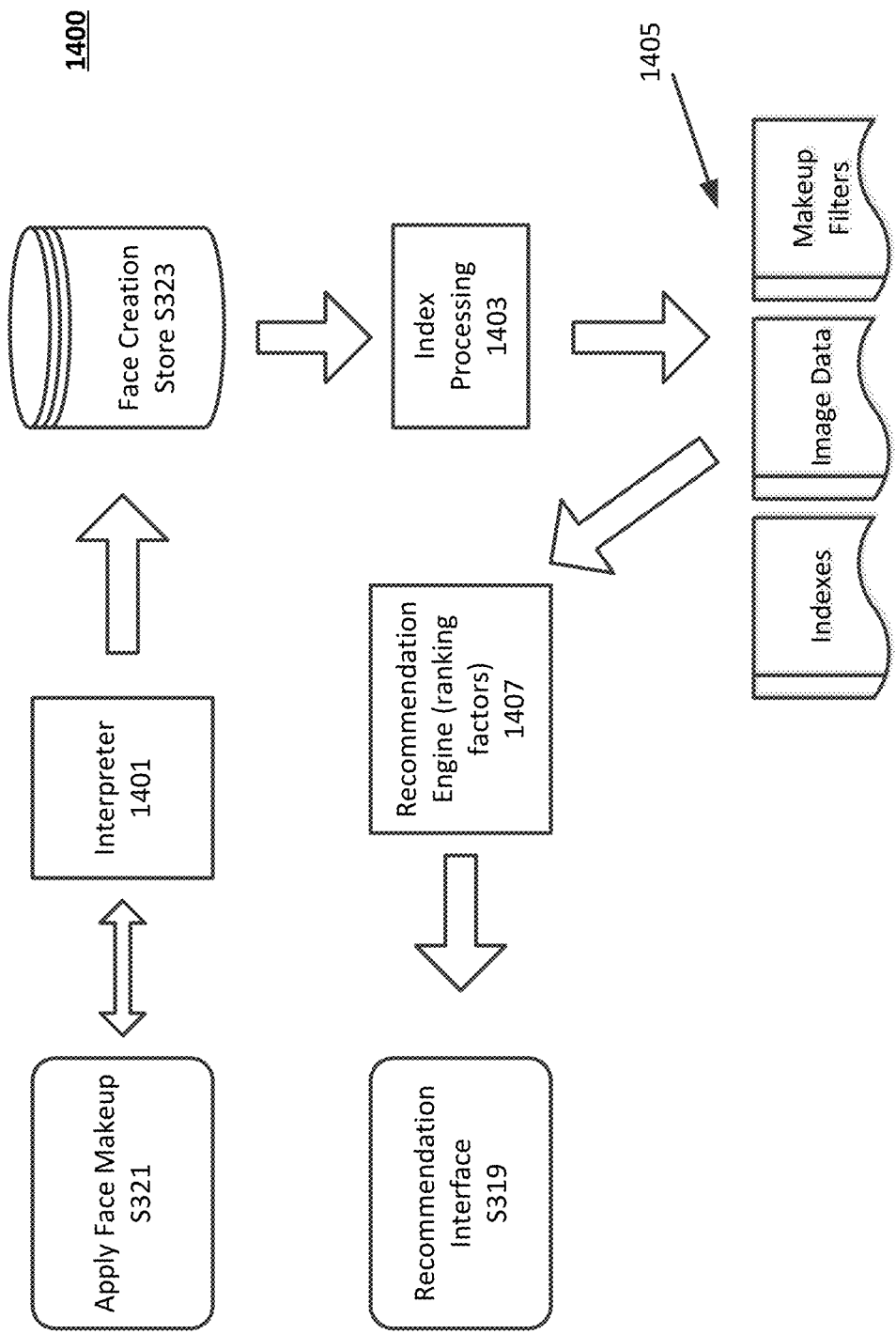
FIG. 14 is a diagram for a recommender system.

FIG. 14 is a diagram for a recommender system. The recommender system 1400 may be used for showing how to apply a virtual makeup (S319 in FIG. 3A). The recommender system 1400 works off of an indexed database 1405 of image data and makeup filters. The recommender system 1400 includes a recommendation engine 1407 that retrieves and ranks recommendations. In the case of application of a particular virtual makeup, a recommendation may be for the look that the user has input in step S301 and the virtual makeup. In some embodiments, the recommendations may be retrieved based on user preferences or favorites. Personal user preferences may be makeup characteristics that a user has entered when the App 111 is first set up. Favorites may be makeup characteristics that a user has flagged as being a favorite. Personal preferences and favorites may be for particular parts of a face or for the entire face.

In some embodiments, the recommendation engine 1407 may use a look-feature matrix. FIG. 15 illustrates a non-limiting look-feature matrix in accordance with an exemplary aspect of the disclosure. The look-feature matrix in FIG. 15 is a partial matrix showing two types of virtual makeup for the sake of brevity. Other types of virtual makeup may be included in the matrix, including, but not limited to, foundation, mascara, concealer, cheek powder, eyebrow pencil, to name a few. The look-feature matrix may be stored in the App 111 in the mobile device to be compared to a vector of desired features. The desired features may be current user preferences and may take into account the user's current experience level and a desired look. The recommendation engine 1407 may use one or more similarity metrics and a scoring algorithm to rank recommendations. In an embodiment, the recommendation engine 1407 may generate a set of features that elevate recommendations in order to encourage creativity by changing certain characteristics for a virtual makeup from those that are recommended. For example, if the recommendation engine 1407 ranks a recommendation high among retrieved recommendations, it may then change one or more characteristics in order to increase a similarity score. Alternatively, the recommendation engine 1407 may change one or more characteristics in a retrieved recommendation, such as shade or finish, to one up or one down (e.g., change a shade to one level up or one level down from the stored shade). In one of more embodiments, the recommendation engine 1407 may adjust the application gesture to be more or less precise based on the experience level of the user.

The recommendation engine 1407 may output one or more recommendations to a recommendation user interface (S319). The recommendation user interface (S319) may display a sequence of video frames that demonstrate application of a selected recommendation.

Figure 16:
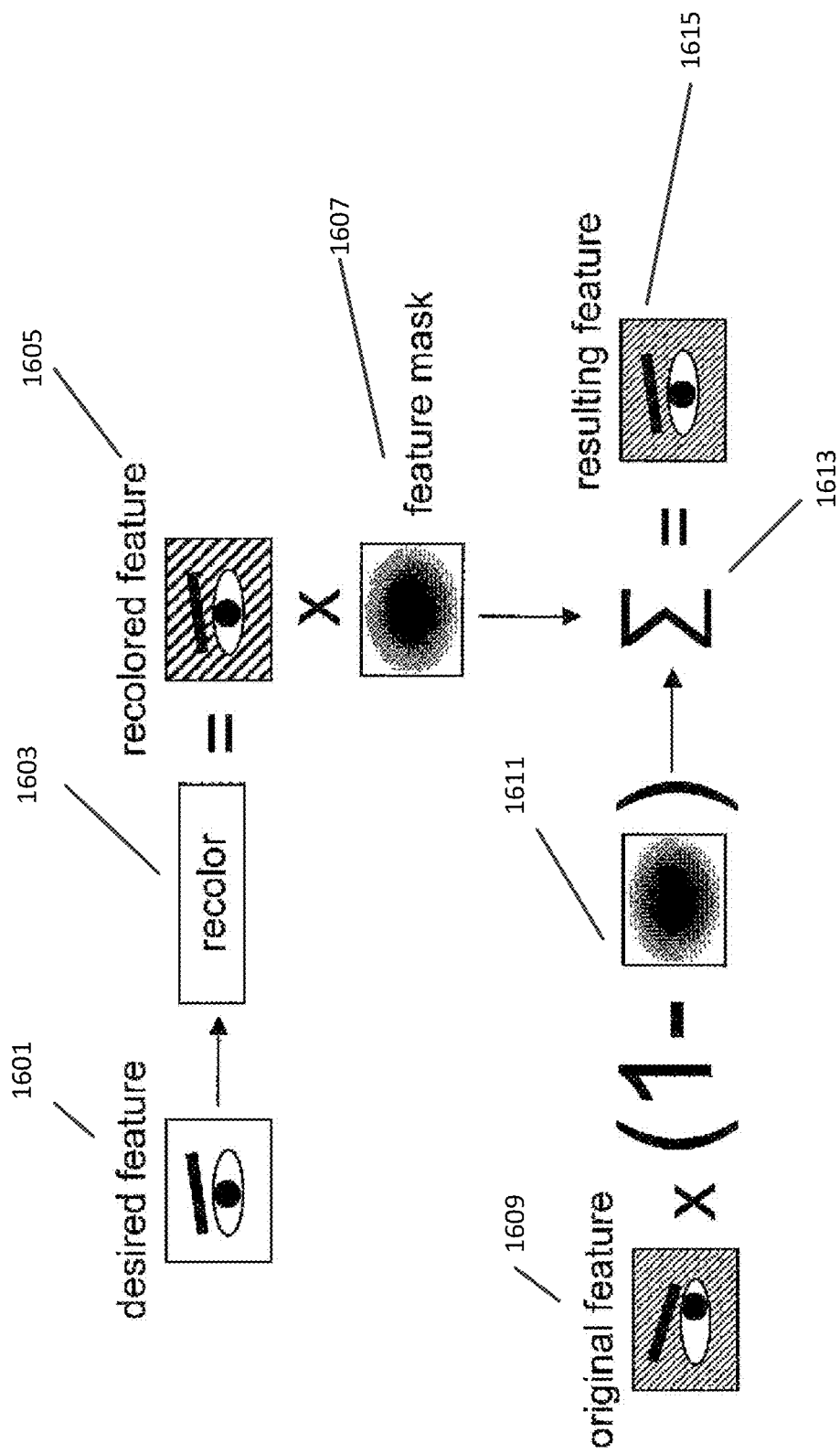
FIG. 16 illustrates a blending process that may be used to create a face image based on a desired feature and an original feature.

In one or more embodiments, the video frames for the recommendations may be generated using the face image of the user and one or more makeup filters stored in database 1405. The indexed database 1405 may provide one or more makeup filters to be used to create the sequence of video frames. FIG. 16 illustrates a blending process that may be used to create a face image based on a desired feature and an original feature in the face image.

The blending of a facial feature is accomplished as follows.

1. The desired feature 1601 is recolored, 1603, to match the color of the original feature and obtain a recolored feature 1605.

2. The recolored feature 1605 is multiplied by a feature mask 1607.

3. The original feature 1609 is multiplied by the inverse 1611 (i.e., one minus each of the mask values, which range from 0 to 1) of the feature mask.

4. The resulting images of 2 and 3 are added 1613 pixel by pixel to make the final blended feature image 1615.

The border of the original feature may have been determined during the face analysis step, S309. A sequence of video frames may be generated as an animation to demonstrate how to apply virtual makeup to a particular face part.

In S321, the user may mimic the demonstrated application of the virtual makeup to apply the makeup by making one or more swipes at the facial location of the face image using the stylus or mouse that is configured to draw as a specific type of applicator.

Figure 17:
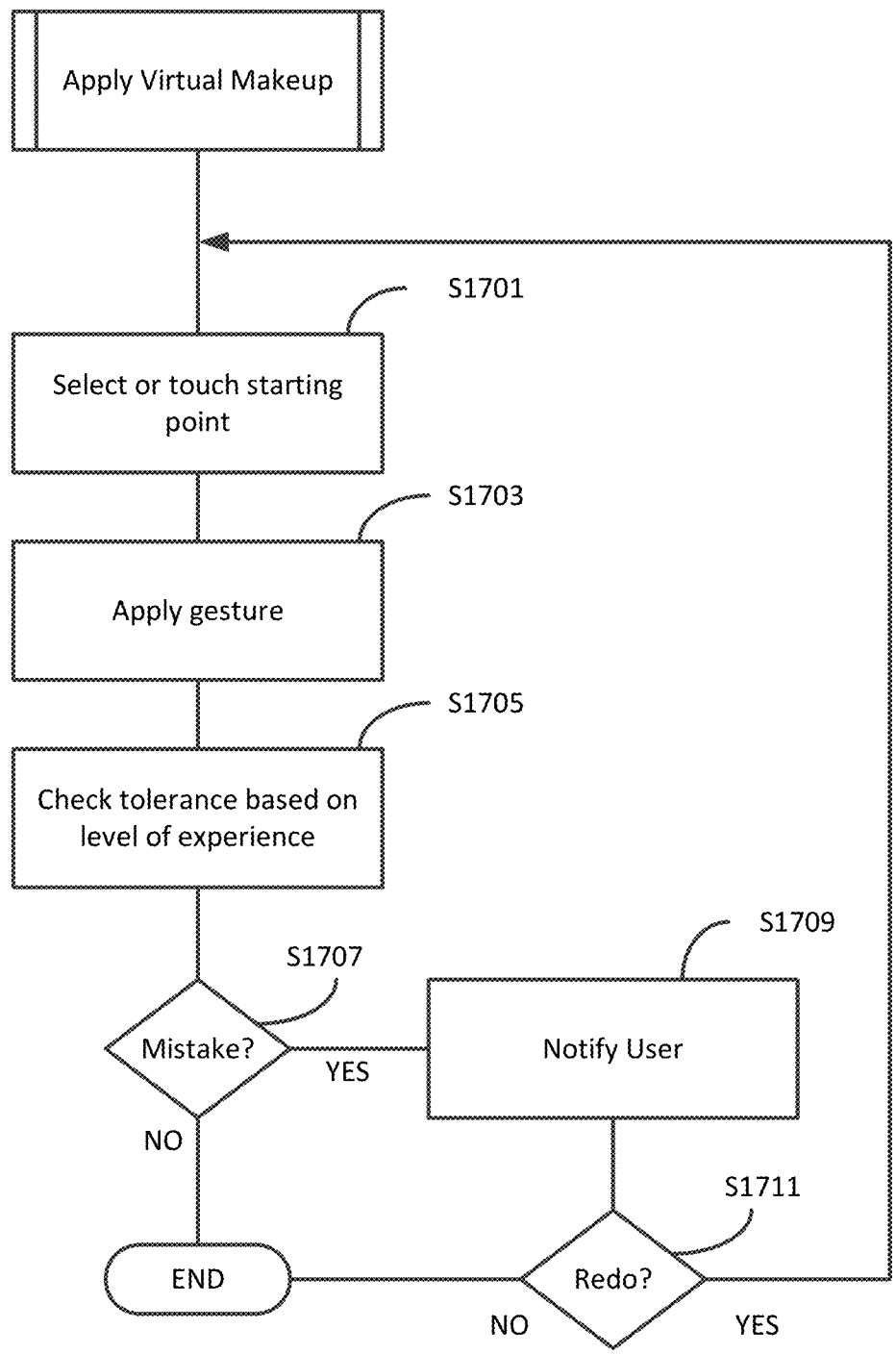
FIG. 17 is a flowchart for a step of applying virtual makeup in accordance with an exemplary aspect of the disclosure.

FIG. 17 is a flowchart for a step of applying virtual makeup in accordance with an exemplary aspect of the disclosure. In S1701, the user may interact with the user interface to select or touch a starting point for applying virtual makeup. In S1703, the user may perform a gesture to apply the virtual makeup. The gesture may be a swipe motion, a line draw motion, or a tap motion. A swipe motion may be made, for example, in a case of applying mascara to eye lashes. A thicker applicator may be used in a swipe motion to apply wider strokes such as for eye shadow. A line draw motion may be used, for example, to apply an eye liner. A line draw motion with a thicker line may be used to apply lipstick. A tap motion may be used to apply a face powder.

In one or more embodiments, in S1705, gestures may be analyzed based on level of experience of the user to determine whether the gesture was applied in error, i.e., as a mistake. For a novice user, a greater amount of error may be allowed than for an experienced user. In such case, a gesture that is outside a tolerance amount may be judged as a mistake for an experienced user, whereas the tolerance amount may be greater for a novice user. When a gesture by a novice user is outside the higher tolerance amount, the gesture may be determined as being an error. In S1707, the App 111 determines whether the gesture has been applied in error, i.e., as a mistake. If it is determined that the gesture is made outside of a tolerance amount (YES in S1707), in S1709, a notification message may be displayed to notify the user that the gesture may have been applied as a mistake, and/or ask the user to verify that the gesture has been applied satisfactorily. The App may provide the user with an option, in S1711, to redo the application of the virtual makeup. When there is no mistake (NO in S1707) or the user chooses not to redo the virtual makeup (NO in S1711), the App 111 goes to the next step S323.

In some embodiments, the areas and swipe movements may be limited or controlled to stay within facial features. For example, when a stylus touches the screen, the mobile application 111 may detect the location as being within a facial feature. As the stylus is moved, a swipe may be drawn on the screen, but without drawing outside the boundary of the facial part, for example, as determined in the face analysis step, S309. Drawing on the screen may be performed in accordance with characteristics of the makeup product, including coverage, shade, and finish. Drawing on the screen may be performed in accordance with common application gestures and facial areas.

Figure 18:
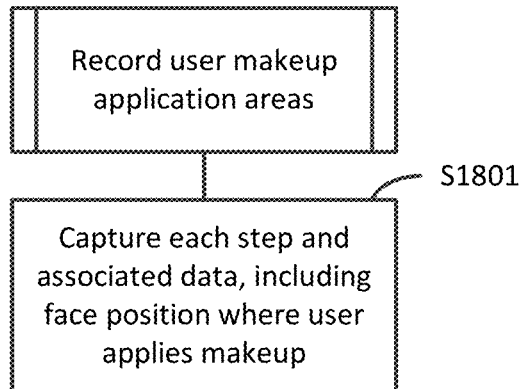
FIG. 18 is a flowchart of a step of recording areas and swipes while applying makeup.

In S323, the mobile application 111 may record in a memory 202 of a mobile device 101, 103, the areas and swipe movements as the user applies the virtual makeup. FIG. 18 is a flowchart of a step of recording areas and swipes while applying makeup. Regarding FIG. 18, in S1801, the mobile application 111 may track and record each step and associated data in a memory, including a location on the face image where the virtual makeup is applied and the number of swipes.

Figure 19:
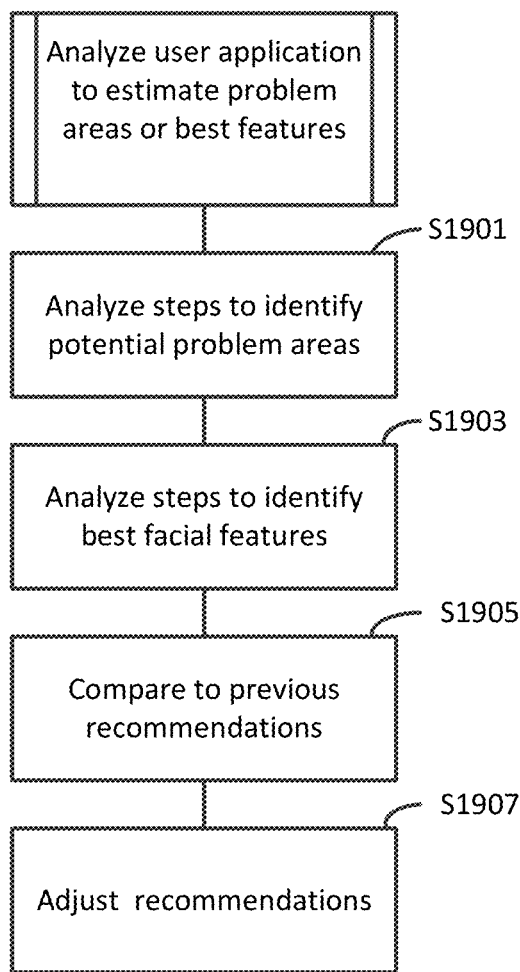
FIG. 19 is a flowchart of a step of analyzing a user's steps in applying makeup to estimate problem areas or best features.

In S325, the mobile application 111 analyzes the recorded locations and swipes of the virtual makeup and characteristics of the virtual makeup in order to estimate problem areas or best features of a user's face. The locations may be mapped to facial features. FIG. 19 is a flowchart of a step of analyzing a user's steps in applying makeup to estimate problem areas or best features. Regarding FIG. 19, in S1901, the mobile application 111 may analyze makeup swipes to identify potential problem areas. Potential problem areas may include blemishes, scars, age spots, and forms of hyperpigmentation. Potential problem areas may be facial areas that a user believes to be a problem, or unwanted feature. In other words, potential problem areas may be areas that a user wishes to cover up or alter in appearance.

The mobile application 111 may identify a potential problem area by detecting an unusual swipe gesture in a particular location of a facial feature. The unusual swipe gesture may include an abrupt change in direction or an abrupt change in force that was not made by mistake. The mobile application 111 may identify a potential problem area by way of detecting that the user is applying a different virtual makeup, or alternative color, from the digital makeup palette (i.e., virtual makeup with different coverage characteristic and/or different shade), to a particular facial area.

In S1903, the mobile application 111 may analyze makeup swipes to identify best facial features. Best facial features may include cheekbones, eye color, eyelashes, lip shape, or any feature that a user wishes to emphasize. The mobile application 111 may detect a best facial feature by detecting a change in application of makeup to a facial feature that is different, by a threshold amount, from an average application of makeup to the same facial feature. For example, the mobile application 111 may detect a best facial feature by detecting application of a color that is of a shade and/or finish that is different from a typical shade and/or finish of the color that would be applied to the facial area. In the case of eye color, the mobile application 111 may detect that eye color is a best facial feature by detecting application of a particular eye shadow color.

In S1905, the mobile application 111 may compare identified problem areas and best facial features with previous stored recommendations. The mobile application 111 may determine that there may be some new problem areas, or that some problem areas are no longer possible problem areas. The mobile application 111 may raise the importance of problem areas that have previously been considered as potential problem areas.

In S1907 the results of the comparison may be used to adjust the recommendations so that such that the recommendation engine 1407 will assign a higher score to the recommendation that has had a verified problem area. New problem areas and best facial features, or problem areas and best facial features that are no longer potential problem areas or best facial features may be used to adjust recommendations when they have a likelihood to support the change to new or no longer potential.

A user may apply virtual makeup from the digital makeup palette in a manner that corrects a problem area or that emphasizes best features. In one or more embodiments, a problem area may be corrected by applying a filter for blurring an imperfection in a problem area. For example, a blemish may be made less noticeable by blurring the region in the face image containing the blemish.

As noted above, potential problem areas may be facial areas that a user believes to be a problem, or unwanted feature. Best facial features may include cheekbones, eye color, eyelashes, lip shape, or any feature that a user wishes to emphasize.

In S327, the mobile application 111 may store verified problem areas and verified best facial features and user makeup application as future custom recommendations in the database 1405.

Regarding FIG. 3B, in S331, the user may choose to repeat steps of applying a virtual makeup for another virtual makeup. After all desired virtual makeup has been applied, the user may select, (YES in S333), to save, in S335, the look that has been created in the database 107. In S337, the user may also choose (YES in S337) to move/publish the look, in S339, that has been created, to a social media platform or other platform having live video. In one or more embodiments, the look may be stored as a makeup filter that may be applied to another face image.

Figure 20:
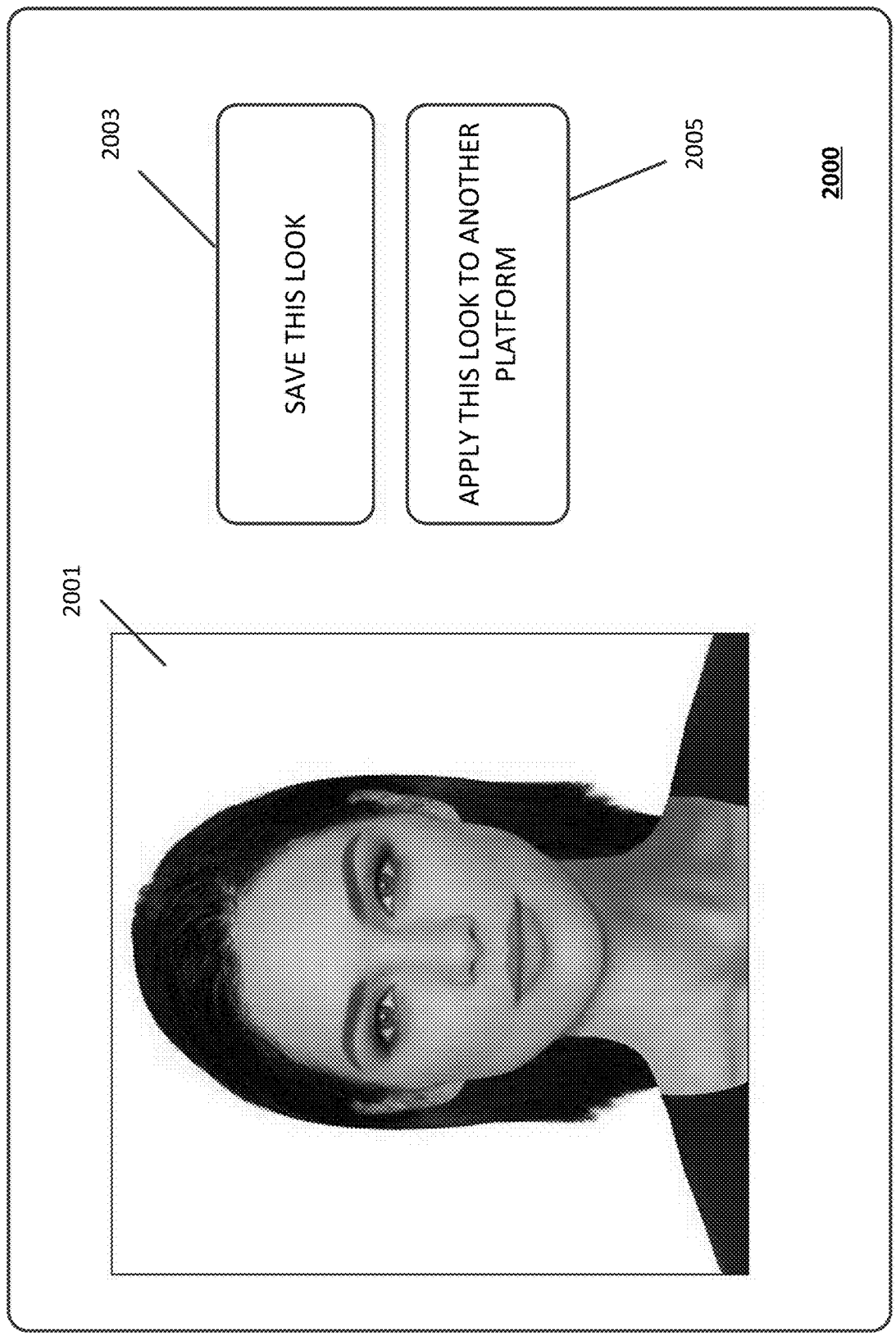
FIG. 20 is an exemplary user interface for storing a makeup look in accordance with an exemplary aspect of the disclosure.

FIG. 20 is an exemplary user interface for storing a makeup look. The user interface 2000 may display the finished face image 2001 and provide a button 2003 that is for a function to save the finished face image. The finished face image may be stored as the underlying face image and one or more filters that may be applied to the underlying face image to recreate the finished face image. In some embodiments, the finished face image may be stored as the underlying face image and the recorded swipes of makeup product or products. The user interface 2000 may further provide a button 2005 that is for a function to move the finished face image to a platform providing live video or still images, such as a social media platform or video conferencing platform. Examples of social media platforms include Facebook, Linked-in, Instagram, YouTube, Snapchat, TikTok, to name a few. Examples of video conferencing platforms include Microsoft Teams, FaceTime, Google Hangouts or Google Meet, and Zoom, to name a few.

In some embodiments, the one or more makeup filters for recreating the finished face image may be provided to the social media platform or video conferencing platform. The one or more filters may be applied to another base image to obtain a new finished face image.

In some embodiments, in S315, the user may forward the digital makeup palette and captured face image to another user. In such case, S321 to S327 may be performed while the other user performs makeup application. The other user may be a person that has a higher level of experience in applying makeup, or a person that the original user believes may create a type of makeup look that the original person may prefer.

Figure 21:
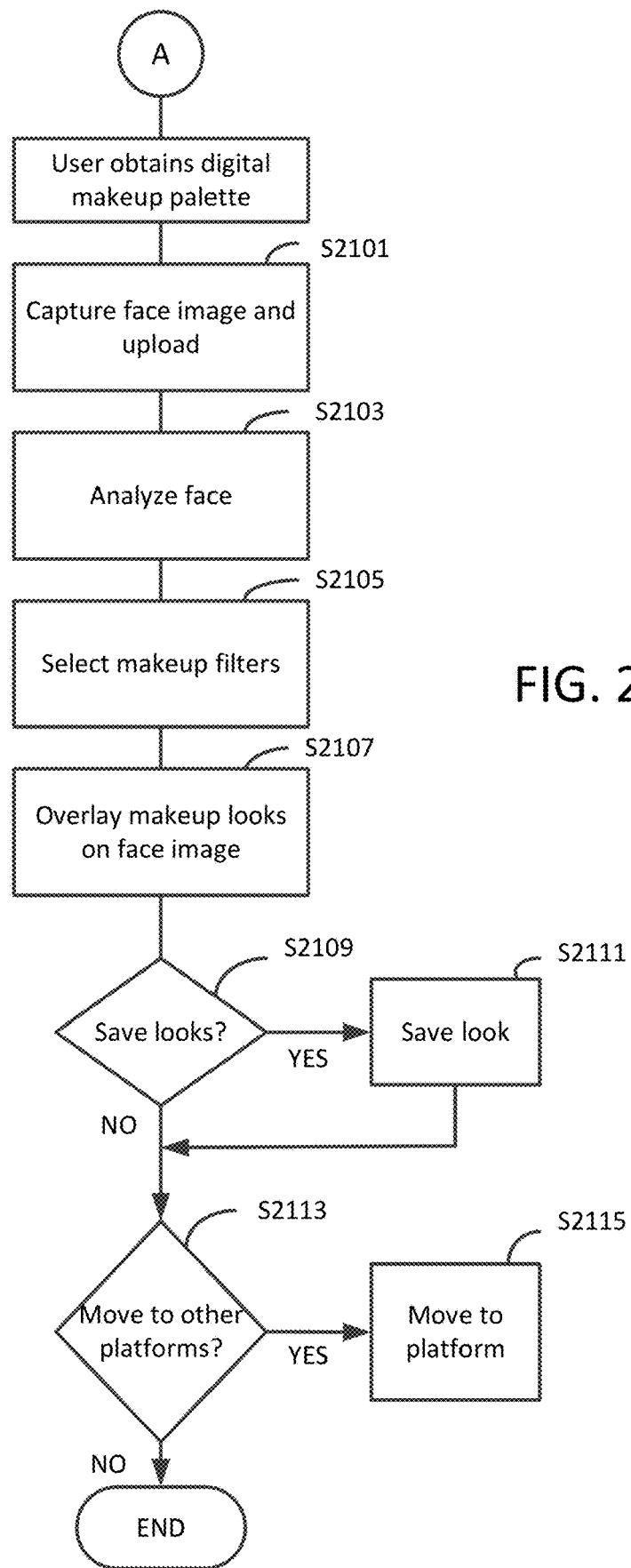
FIG. 21 is a flowchart of a method of custom application of a digital palette in accordance with an exemplary aspect of the disclosure.
Figure 22:
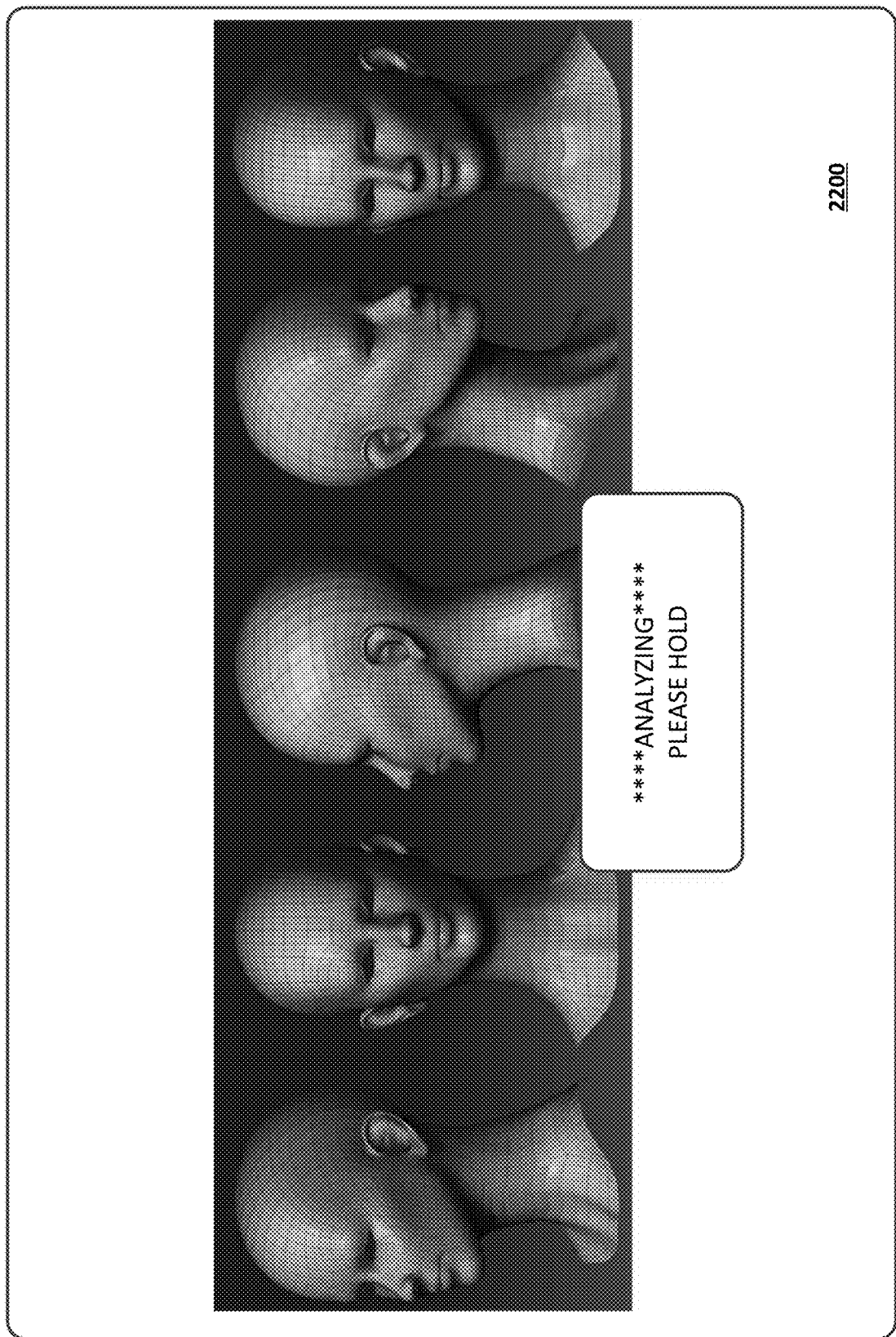
FIG. 22 is an exemplary user interface showing status of custom makeup application.

FIG. 21 is a flowchart of a method of custom application of a digital palette. When a user selects to have a custom makeup look created (Custom in S303), in S2101, the user may be instructed to capture an image, images, or video of the user's face. The camera 231 of the mobile device 101, or an external camera, may be used to capture an image or video of the user's face. In S2103, the mobile application 111 may analyze the captured face of the user. FIG. 22 is an exemplary user interface for indicating status of the creation of a custom makeup application. FIG. 8, as described above, is a flowchart of the face analysis step in more detail. FIG. 9, as described above, is a block diagram of a CNN for classifying face shape. Dimensions and activation functions of the CNN may be varied depending on available processing power and desired accuracy. The dimensions include channels, size of each layer and the number of layers. Activation functions include logistic, rectified linear unit, among others. FIG. 10, as described above, is a diagram of a deep learning neural network for face landmark detection.

In S2105, one or more makeup filters may be selected/retrieved from the database 107 based on the facial features and past look preferences determined by the face analysis (S2103 and FIG. 8). Some stored makeup face filters may be filters that have been previously created by the user (upon selecting "Do it yourself" in S303). Some makeup filters may be for common looks.

Figure 23:
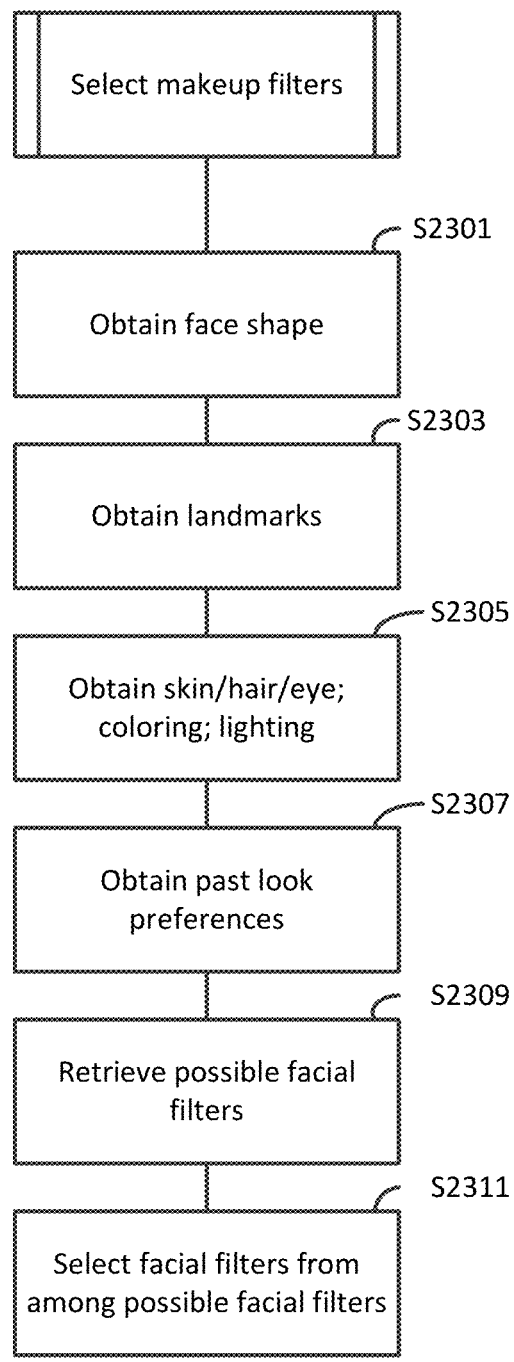
FIG. 23 is a flowchart for a method of selecting makeup filters in accordance with an exemplary aspect of the disclosure.

FIG. 23 is a flowchart for a method of selecting makeup filters. In S2301, the face shape from the results of the analysis in S2103 is obtained. In S2303, the landmarks from the results of the analysis in S2103 are obtained. In S2305, features of the skin, hair, eyes, face coloring and lighting are obtained from the analysis in S2103. In S2307, past look preferences for the digital makeup palette may be obtained. In S2309, possible facial filters for the landmarks, the face shape, skin color, hair style, eyelid shape, past preferences are retrieved from the database 107. In S2311, a subset of the retrieved facial filters may be selected. Selection criteria may include random selection among the possible facial filters, selection of facial filters that best meet past look preferences, selection of at least one facial filter that is unlike past look preferences, in order to give the user a custom look, but that may still offer the user a choice of a different creative look.

In S2107, the retrieved makeup filters may be overlayed on a face image to obtain one or more custom looks. The overlay process may include aligning the makeup filters based on the face shape and facial landmarks. The blending process of FIG. 16 may be used to perform the overlay process by creating a face image based on a desired feature and an original feature in the face image.

The user may select, (YES in S2109), to save, in S2111, the looks created by the mobile application 111 in the database 107. In S2113, the user may also choose (YES in S2113) to move/publish a makeup look, in S2115, that has been created, to a social media platform or video conferencing platform.

Figure 24:
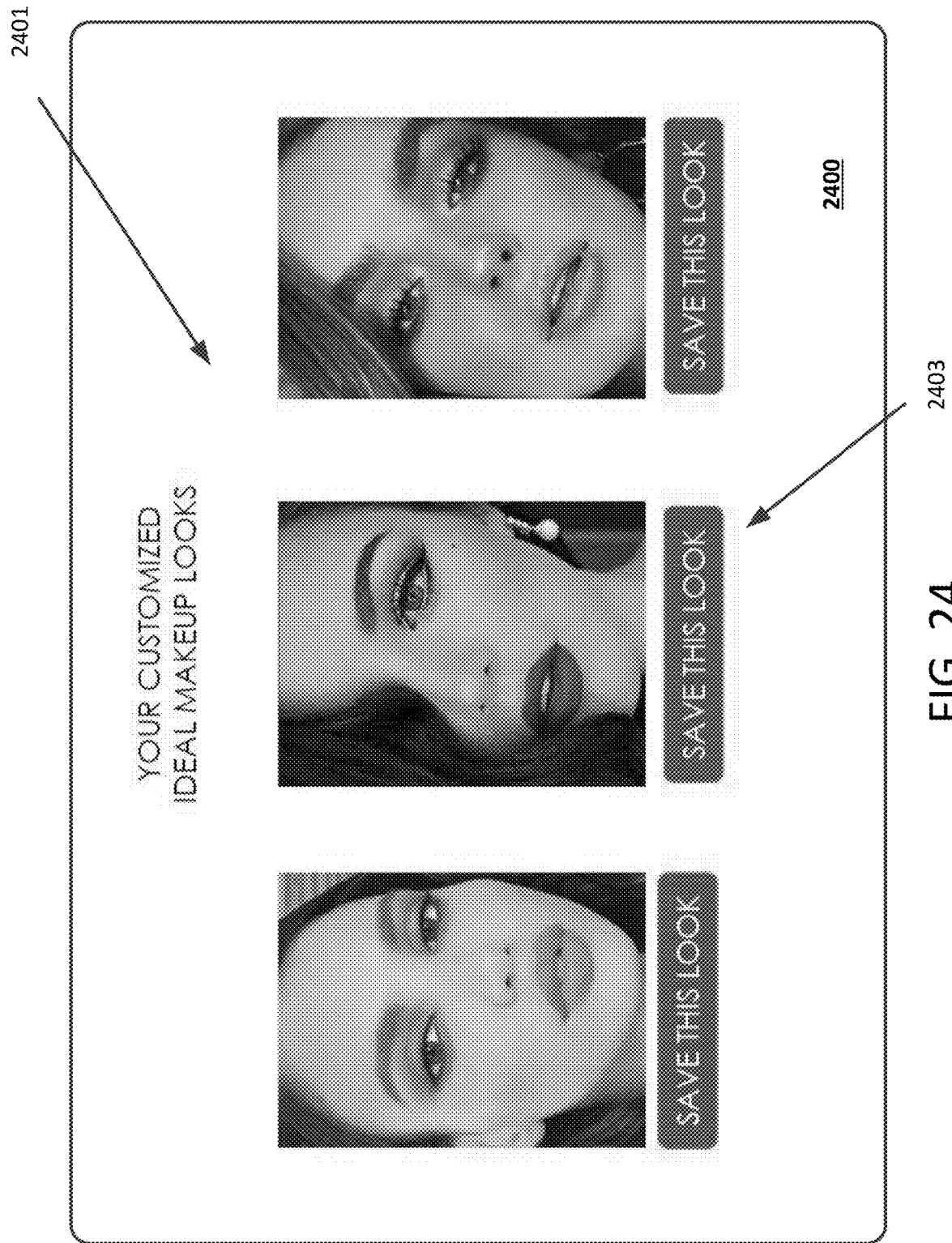
FIG. 24 is an exemplary user interface for saving makeup looks.

FIG. 24 is an exemplary user interface for storing makeup looks. The user interface 2400 may display the finished face images 2401 and provide buttons 2403 that are for a function to save the respective finished face image. The finished face image may be stored as the underlying face image and one or more makeup filters that may be applied to the underlying face image to recreate the finished face image. In some embodiments, the finished face image may be stored as the underlying face image and the recorded swipes of makeup product or products. The user interface 2400 may further provide a button (Not shown) that is for a function to move the finished face image to a social media platform or a video conferencing platform. Examples of social media platforms include Facebook, Linked-in, Instagram, Snapchat, YouTube, TikTok, to name a few. Examples of video conferencing platforms include Microsoft Teams, FaceTime, Google Hangouts or Google Meet, and Zoom.

Numerous modifications and variations of the present invention are possible in light of the above teachings. For example, data gathered from various consumers' skin tones and texture will allow scaling of the artificial neural network to more than a single consumer. The artificial neural network will be able to predict for each product shade the rendering of new cosmetic formula.

In one or more embodiments, a form of machine learning, such as reinforcement learning, may be used to learn what the user believes to be a problem area and what areas the user wishes to emphasize as a best facial feature.

Figure 25:
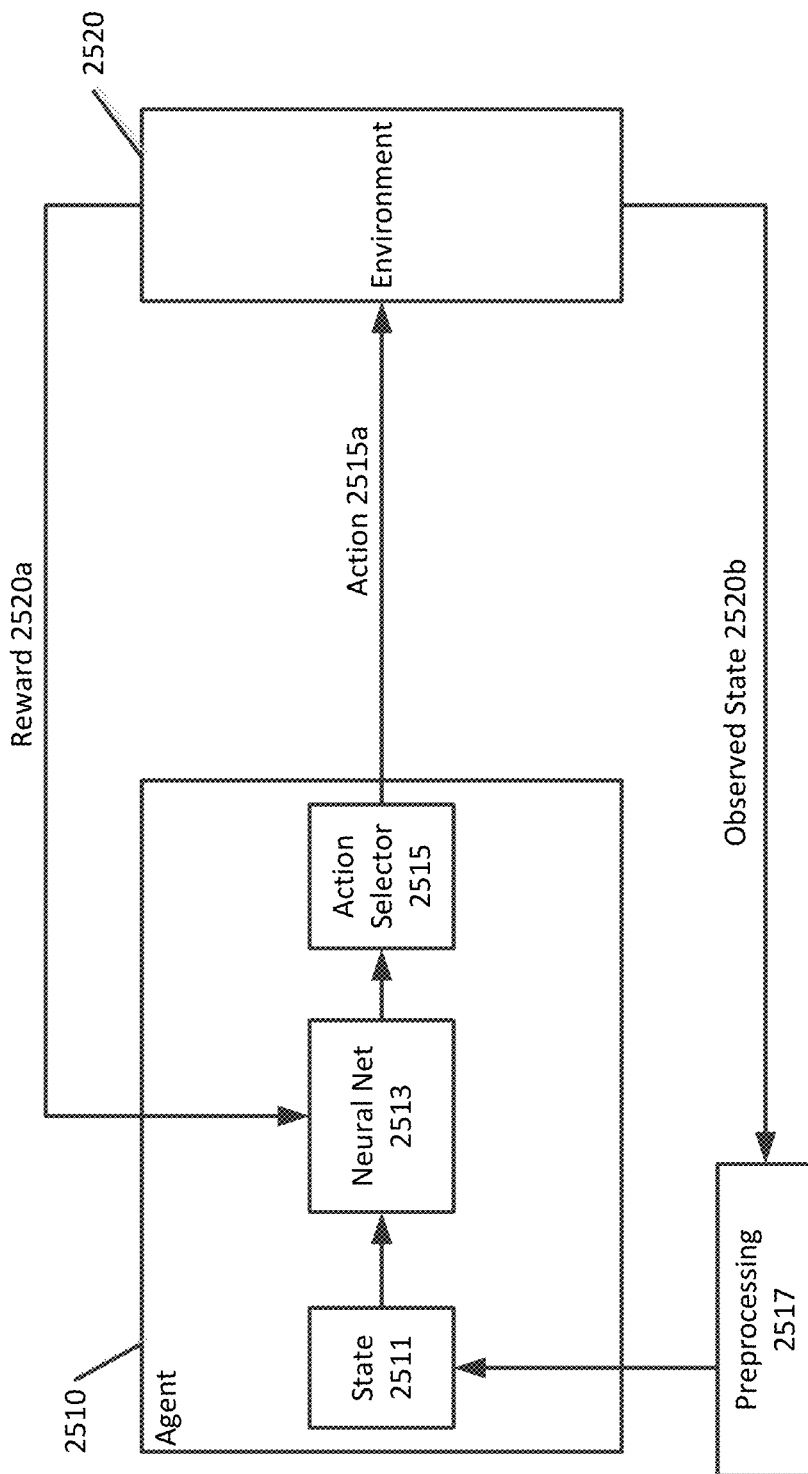
FIG. 25 is a block diagram of a reinforcement learning architecture.

FIG. 25 is a block diagram of a type of reinforcement learning architecture. It is noted that various architectures and algorithms have been developed for reinforcement learning, including Deep reinforcement learning, Q-learning, Deep Q Network, to name a few. In this disclosure, a general description of reinforcement learning is provided, and should be understood to apply to various approaches to reinforcement learning.

Different from supervised learning, reinforcement learning is a form of machine learning where the output is not required to be known in advance. Instead actions output by an actor result in a reward that indicates whether the action was appropriate or not. A reinforcement learning system may involve an actor that instructs movement actions in an environment, and the choice of action may result in a reward in the form of a score of a certain value. The movement action places the environment into a new state. The score is fed back to the actor, which makes adjustments to its machine learning component. An example movement action may be one in which an actor in the environment makes a move to a new location and performs a task, where the task results in an increase in the actors score value. The increase in score serves as a reinforcement that the movement action was beneficial. A next movement action may be one in which the actor in the environment makes a move that does not make it to the new location, and subsequently results in a negative score, or at least does not increase a score value. The decrease in score is fed back as a negative effect and the machine learning component may be adjusted to learn that the movement action instructed by the actor was not a good choice given the state of the environment. Thus, reinforcement learning can continue to adopt as the actor continues to instruct movement actions.

Regarding FIG. 25, an agent 2510, via an artificial neural network 2513, interacts with its environment 2520 in discrete time steps. At each time t, the agent 2510 receives an observation which typically has an associated reward. The agent then chooses an action from a set of available actions, which is subsequently sent to the environment 2520. The environment 2520 moves to a new state and the reward associated with the transition is determined. The goal of a reinforcement learning agent 2510 is to collect as much reward as possible. The agent 2510 can (possibly randomly) choose any action as a function of the history of previous actions.

Figure 26:
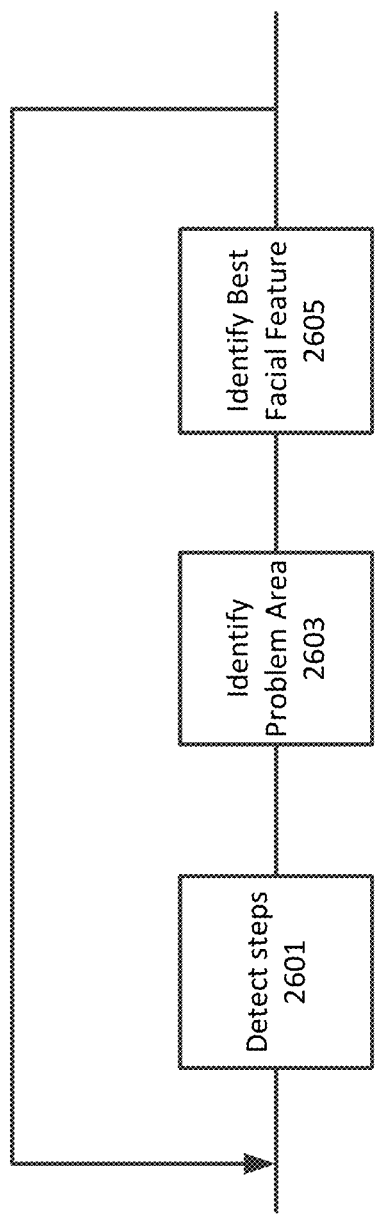
FIG. 26 is a flow diagram of a machine learning model in accordance with an exemplary aspect of the disclosure.

In one embodiment, a reinforcement learning system may be arranged to learn what the user believes to be a problem area and what areas the user wishes to emphasize as a best facial feature may be provided as two reinforcement learning processes. FIG. 26 is a flow diagram of a machine learning system in accordance with an exemplary aspect of the disclosure. As described above, reinforcement learning generally performs learning through feedback of a reward 2520a. In some embodiments, the feedback may be provided in the form of voice interaction with the mobile application 111 as the user applies a makeup product to a face image. The voice feedback may be provided using a microphone 103a, 241 and the feedback may be provided in response to questions and statements output through an audio circuit 242.

In one embodiment, the reinforcement learning system 2600 may take the form of multiple reinforcement learning models. One reinforcement learning model 2603 may detect a problem area based on one, or a series of swipes, 2601, of a makeup product to a face image. The reinforcement learning system 2600 may verify the detection of the problem area (i.e., feedback a reward) by asking a question, such as, "are you applying makeup to a problem area?" Another reinforcement learning model 2605 may detect a best facial feature based on one, or a series of swipes, 2601 of a makeup product to a face image. The reinforcement learning system 2600 may verify the detection of the best facial feature (i.e., feedback a reward) by asking a question, such as, "are you applying makeup to a special facial feature?" The reinforcement learning system may utilize information of the location of a problem area or best facial feature to provide a more specific question, such as, "are you applying makeup to a blemish?" or "are you applying makeup to emphasize your eye color?"

Although the reinforcement learning system 2600 in FIG. 26 is a series of machine learning models, an alternative approach may be to include a machine learning component to initially classify one or a series of swipes as being for a problem area, a best facial feature, or neither, and providing the result of the initial classification to either the reinforcement learning model 2603, the reinforcement learning model 2605, or neither model.

The response by the user may be used to apply a reward to the reinforcement learning system. The reward may be a positive or a negative score depending on the user's response. The score will be used to adjust parameters in the respective machine learning model 2603 or 2605.

Another approach that performs continuous learning similar to reinforcement learning to detect a problem area or detect a best facial feature is regression analysis. An advantage of regression analysis is that it is fast to compute. However, models for nonlinear regression analysis are more suitable for predicting predictable data. Data of makeup swipes may be difficult to clearly predict, as they may be made for reasons other than for problem areas or best features.

In an embodiment, the words "a," "an" and the like generally carry a meaning of "one or more," unless stated otherwise.

In an embodiment, the terms "approximately," "approximate," "about," and similar terms generally refer to ranges that include the identified value within a margin of 20%, 10%, or preferably 5%, and any values therebetween.

It is therefore to be understood that within the scope of the appended claims, the invention may be practiced otherwise than as specifically described herein.

The invention claimed is:

1. An augmented reality system for makeup, comprising:
computation circuitry; and
a graphical user interface;
wherein the computation circuitry is configured as a makeup objective unit operably coupled to the graphical user interface, the makeup objective unit generates one or more instances of user selectable makeup objectives and receives, via the graphical user interface, user-selected makeup objective information that includes a user experience level in applying makeup,
wherein the computation circuitry is further configured as a makeup palette unit operably coupled to the makeup objective unit, the makeup palette unit generates at least one digital makeup palette for a digital makeup product in accordance with the user-selected makeup objective information, and
wherein the computation circuitry is further configured as a makeup objective visualization unit that generates one or more instances of a virtual try-on in accordance with the user-selected makeup objective information including the user experience level,
wherein at least one of the instances of the virtual try-on are generated with makeup that is applied by a user within a tolerance amount with respect to a boundary of a face part in an image of the user's face,
wherein the tolerance amount is based on the user's level of experience in applying makeup.

2. The augmented reality system for makeup of claim 1, wherein the computation circuitry of the makeup palette unit is configured to obtain an aesthetic look palette from a plurality of pre-set aesthetic look palettes for a plurality of digital makeup products.

3. The augmented reality system for makeup of claim 2, wherein the computation circuitry of the makeup objective visualization unit is further configured to:
generate a virtual representation of the face of the user using the aesthetic look palette including at least one modification to make the image of the user's face more or less dramatic.

4. The augmented reality system for makeup of claim 2, wherein the computation circuitry of the makeup objective visualization unit is further configured to:
generate a virtual representation of the face of the user using the aesthetic palette including at least one modification to remove blemishes by blurring a portion of the user's face image.

5. The augmented reality system of claim 1, wherein the computation circuitry of the makeup objective visualization unit is further configured to:
transfer the one or more instances of the virtual try-on of the image of the user's face to a platform for live video.

6. The augmented reality system for makeup of claim 1, wherein the computation circuitry of the makeup objective visualization unit is further configured to:
transmit at least a portion of the image of the user's face to a second makeup objective visualization unit for a second user,
computation circuitry of the second makeup objective visualization unit is configured to:
analyze the user's face image to identify face parts,
track and record, in a memory, at least one gesture by the second user that applies the digital makeup product to the image of the user's face,
analyze the at least one gesture to estimate problem areas in the user's face or to estimate an emphasis on specific facial features, and
store the estimated problem areas together with coverage, shade and finish, that was applied, in the memory.

7. The augmented reality system for makeup of claim 6, wherein the computation circuitry of the second makeup objective visualization unit is further configured to:
receive a second user's level of experience in applying makeup,
detect one or more swipes on a touch screen,
apply a selected color in an area of the image of the user's face at a location of a face part indicated by the one or more swipes, wherein the face part has a boundary, and
analyze the applied color to determine if the one or more swipes are outside a tolerance amount from the boundary, wherein the tolerance amount is based on the second user's level of experience in applying makeup.

8. The augmented reality system for makeup of claim 6, wherein the computation circuitry of the second makeup objective visualization unit is further configured to analyze the gestures to estimate the problem areas using a problem area reinforcement learning model.

9. The augmented reality system for makeup of claim 6, wherein the computation circuitry of the second makeup objective visualization unit is further configured to analyze the gestures to estimate an emphasis of facial features using a best feature reinforcement learning model.

10. The augmented reality system for makeup of claim 6, wherein the computation circuitry of the second makeup objective visualization unit is further configured to use a gesture identification machine learning model to distinguish between a gesture for a problem area and a gesture for an emphasized facial feature.

11. An augmented reality system for makeup, comprising:
computation circuitry;
a graphical user interface;
a memory; and
an input device,
wherein the computation circuitry is configured as a makeup objective unit operably coupled to the graphical user interface, the makeup objective unit generates one or more instances of user selectable makeup objectives and to receive user-selected makeup objective information that includes a user experience level in applying makeup,
wherein the computation circuitry is further configured as a makeup palette unit operably coupled to the makeup objective unit, the makeup palette unit that generates at least one digital makeup palette for a digital makeup product in accordance with the user-selected makeup objective information, and
wherein the computation circuitry is further configured as a makeup objective visualization unit that generates one or more instances of a virtual try-on in accordance with the user-selected makeup objective information including the user experience level,
wherein the computation circuitry of the makeup objective visualization unit is further configured to:
receive a digital image of a user's face,
analyze the user's face image to identify face parts,
track and record, in the memory, at least one gesture input by the input device to apply the digital makeup product to the image of the user's face,
analyze the recorded at least one gesture to estimate problem areas in the user's face, and
store the estimated problem areas together with coverage, shade and finish, that was applied, in the memory.

12. The augmented reality system for makeup of claim 11, wherein the computation circuitry of the makeup objective visualization unit is further configured to:
generate a virtual representation of the portion of the face of the user including at least one modification consistent with the user-selected makeup objective information.

13. The augmented reality system for makeup of claim 11, further comprising a touch screen,
wherein the at least one gesture by the user includes one or more swipes on the touch screen, and
wherein the computation circuitry of the makeup objective visualization unit is further configured to detect the one or more swipes and apply a selected color to a location in the image of the user's face in the graphical user interface.

14. The augmented reality system for makeup of claim 13, wherein the computation circuitry of the makeup objective visualization unit is further configured to detect the one or more swipes on the touch screen and apply the selected color in an area of the image limited by a boundary of a face part that is at the location in the image of the user's face in the graphical user interface.

15. The augmented reality system for makeup of claim 13, wherein the computation circuitry of the makeup objective visualization unit is further configured to:
receive the user's level of experience in applying makeup,
detect the one or more swipes on the touch screen,
apply the selected color in an area of the image of the user's face at a location of a face part indicated by the swipes, wherein the face part has a boundary, and
analyze the applied color to determine if the one or more swipes are outside a tolerance amount from the boundary, wherein the tolerance amount is based on the user's level of experience in applying makeup.

16. The augmented reality system for makeup of claim 13, wherein the touch screen is a three-dimensional touch screen that senses an amount of pressure being applied to the screen,
wherein the at least one gesture by the user includes a swipe on the three-dimensional touch screen at a certain pressure on the screen, and
wherein the computation circuitry is further configured to detect the one or more swipes and the pressure of the swipes, and apply the selected color to a location in the image of the user's face at a thickness according to the pressure.

17. The augmented reality system for makeup of claim 11, wherein the computation circuitry of the makeup objective visualization unit is further configured to analyze the gestures to estimate the problem areas using a problem area reinforcement learning model.

18. The augmented reality system for makeup of claim 11, wherein the computation circuitry of the makeup objective visualization unit is further configured to analyze the gestures to estimate an emphasis of facial features using a best feature reinforcement learning model.

19. The augmented reality system for makeup of claim 11, wherein the computation circuitry of the makeup objective visualization unit is further configured to use a gesture identification machine learning model to distinguish between a gesture for a problem area and a gesture for an emphasized facial feature.

20. The augmented reality system for makeup of claim 11, wherein the computation circuitry of the makeup objective visualization unit is further configured to use an audio output function of a mobile device to ask the user whether they would like a recommendation on how to apply the digital makeup product to the image of the user's face.

* * * * *